US012577045B2

(12) United States Patent
Masuda

(10) Patent No.: US 12,577,045 B2
(45) Date of Patent: Mar. 17, 2026

(54) TRANSPORT SYSTEM AND STORAGE

(71) Applicant: Murata Machinery, Ltd., Kyoto (JP)

(72) Inventor: Kinya Masuda, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 874 days.

(21) Appl. No.: 17/761,942

(22) PCT Filed: Aug. 3, 2020

(86) PCT No.: PCT/JP2020/029612
§ 371 (c)(1),
(2) Date: Mar. 18, 2022

(87) PCT Pub. No.: WO2021/053978
PCT Pub. Date: Mar. 25, 2021

(65) Prior Publication Data
US 2022/0332500 A1     Oct. 20, 2022

(30) Foreign Application Priority Data

Sep. 18, 2019     (JP) ................................. 2019-169526

(51) Int. Cl.
*B65G 1/04*          (2006.01)
*B61B 3/02*          (2006.01)
(52) U.S. Cl.
CPC .............. *B65G 1/0457* (2013.01); *B61B 3/02* (2013.01); *B65G 2201/0297* (2013.01)
(58) Field of Classification Search
CPC .. B65G 1/0457; B65G 2201/0297; B61B 3/02
See application file for complete search history.

(56) References Cited

U.S. PATENT DOCUMENTS

| | | | |
|---|---|---|---|
| 7,762,754 B2 * | 7/2010 | Maetaki | ................... B66C 1/36 |
| | | | 212/331 |
| 10,414,585 B2 * | 9/2019 | Hamaguchi | ........... B65G 1/137 |
| 10,947,041 B2 * | 3/2021 | Motoori | ........... H01L 21/67769 |
| (Continued) | | | |

FOREIGN PATENT DOCUMENTS

| | | | |
|---|---|---|---|
| CN | 101209774 A | 7/2008 | |
| CN | 107531417 A * | 1/2018 | ............... B65G 1/04 |
| (Continued) | | | |

OTHER PUBLICATIONS

First Office Action dated Feb. 8, 2023, of counterpart Chinese Patent Application No. 202080064735.4., along with an English machine translation.

(Continued)

*Primary Examiner* — Jason C Smith
(74) *Attorney, Agent, or Firm* — DLA Piper LLP (US)

(57)          ABSTRACT

A transport system includes: a grid-patterned rail that has a plurality of first rails extending in a first direction and a plurality of second rails extending in a second direction different from the first direction and intersecting with the first rails and that forms a plurality of cells with the plurality of first rails and the plurality of second rails; an overhead transport vehicle that travels along the grid-patterned rail, a suspender that is suspended from the grid-patterned rail; and a frame surrounding one of the cells in a plan view and is provided below the suspender.

11 Claims, 16 Drawing Sheets

(56) References Cited

U.S. PATENT DOCUMENTS

| | | | | |
|---|---|---|---|---|
| 11,276,596 | B2 * | 3/2022 | Torazawa | B65G 1/0464 |
| 2004/0228709 | A1 * | 11/2004 | Ueda | B65G 1/0421 |
| | | | | 414/279 |
| 2012/0128452 | A1 * | 5/2012 | Murata | H01L 21/67379 |
| | | | | 414/222.01 |
| 2015/0332948 | A1 * | 11/2015 | Ikeda | H01L 21/67736 |
| | | | | 700/230 |
| 2018/0105361 | A1 * | 4/2018 | Horii | H01L 21/67736 |
| 2019/0047786 | A1 * | 2/2019 | Suzuki | H01L 21/67769 |
| 2019/0164795 | A1 * | 5/2019 | Motoori | H01L 21/67769 |
| 2019/0189488 | A1 * | 6/2019 | Ito | B61B 3/02 |
| 2019/0291752 | A1 * | 9/2019 | Takai | B61B 3/02 |
| 2022/0332500 | A1 * | 10/2022 | Masuda | B61B 3/02 |
| 2023/0118995 | A1 * | 4/2023 | Ito | H01L 21/67727 |
| | | | | 700/218 |
| 2024/0051747 | A1 * | 2/2024 | Ito | B61B 3/02 |

FOREIGN PATENT DOCUMENTS

| | | | | | |
|---|---|---|---|---|---|
| CN | 107554534 | A | | 1/2018 | |
| CN | 114401910 | A * | 4/2022 | | B61B 3/02 |
| EP | 3915902 | A1 * | 12/2021 | | B65G 1/0457 |
| JP | H10-139108 | A | | 5/1998 | |
| JP | 2001-093957 | A | | 4/2001 | |
| JP | 2004-284702 | A | | 10/2004 | |
| JP | 2005-299280 | A | | 10/2005 | |
| JP | 2012-249474 | A | | 12/2012 | |
| JP | 2018-065655 | A | | 4/2018 | |
| JP | 2018-193223 | A | | 12/2018 | |
| WO | 2011/013338 | A1 | | 2/2011 | |
| WO | 2014/104895 | A1 | | 7/2014 | |
| WO | 2015/174181 | A1 | | 11/2015 | |
| WO | 2016/029205 | A1 | | 2/2016 | |
| WO | 2017/150006 | A1 | | 9/2017 | |
| WO | 2018/037762 | A1 | | 3/2018 | |
| WO | WO-2019087618 | A1 * | 5/2019 | | B61B 3/02 |

OTHER PUBLICATIONS

Request for Submission of an Opinion dated Dec. 15, 2023, of counterpart Korean Patent Application No. 10-2022-7008948, along with an English translation.

* cited by examiner

TRANSPORT SYSTEM AND STORAGE

TECHNICAL FIELD

This disclosure relates to transport and storage systems.

BACKGROUND

In manufacturing factories such as semiconductor manufacturing factories, for example, a transport system that uses vehicles to transport articles such as transportation containers (FOUPs, reticle pods) for containing semiconductor wafers or reticles is used. As such a system, there is known a system in which a vehicle that holds an article travels along rails installed on a ceiling, and to diversify traveling paths for the vehicle, there has been proposed a configuration in which rails are arranged in a grid pattern to allow the vehicle to travel laterally and longitudinally.

In the above system in which the vehicle travels laterally and longitudinally, a main body of the vehicle is arranged above the rails and a container for storing an article is provided in a main body of the vehicle. Therefore, when loading or unloading an article from or to a predetermined position below the rails, it is necessary to raise or lower the article at a location where there is no rail, or through a space between the rails and, as a result, the position for loading or unloading the article is limited. Therefore, there has also been proposed a transport system in which the vehicle is capable of traveling laterally and longitudinally while holding an article on the lower side of rails (International Publication No. WO 2018/037762).

In the transport system of WO '762 in which the vehicle travels while holding an article on the lower side of the rails, while traveling wheels are provided on the rails, the article container and the main body of the vehicle are arranged below the rails. Therefore, a coupling member that couples the traveling wheels to the container (or the main body) straddles the upper and lower sides of the rails. For this reason, in the rails in a grid pattern mentioned above, gaps (slits) are required to allow the coupling member to pass through intersecting portions. The transport system of WO '762 has gaps provided in the intersecting portion of the rails, and includes a connection rail that splits the rails at the intersecting portion by the gaps (slits).

Use of an aerial work platform or the like is necessary to perform maintenance work on the vehicle mentioned above, the main body of which is suspended from the grid-patterned rail. In the above transport system, a storage capable of storing a plurality of articles may be provided for the purpose of improving the transport efficiency. For example, the storage is suspended from the grid-patterned rail and placed at a high position for effective use of space. When the vehicle or the rail located inside the storage at a high position requires maintenance work, the aerial work platform cannot be brought in because of the presence of structures of the storage such as a frame. The frame needs to be removed to bring the aerial work platform into the storage, which takes time and effort. Also, it is cumbersome to remove the frame every time the aerial work platform is brought into the storage.

It could therefore be helpful to provide a transport system that enables an operator to easily access and perform maintenance work on an overhead transport vehicle, a grid-patterned rail, and an article, at the article storage suspended from the grid-patterned rail.

SUMMARY

We thus provide a transport system including a grid-patterned rail, an overhead transport vehicle, a suspender, and a frame. The grid-patterned rail has a plurality of first rails extending in a first direction and a plurality of second rails extending in a second direction different from the first direction and intersecting with the first rails. The grid-patterned rail forms a plurality of cells with the first rails and the second rails. The overhead transport vehicle travels along the grid-patterned rail. The suspender is suspended from the grid-patterned rail. The frame surrounds at least one of the cells in a plan view and is provided below the suspender. A placement section onto which an article is placed by the overhead transport vehicle and a scaffold serving as a walkway that allows an operator to walk thereon are provided within the frame below the cells.

Further, the frame may be formed to surround the plurality of cells in a plan view, and the scaffold may be formed inside the frame to cross over the plurality of cells in a plan view. The overhead transport vehicle may travel with a main body being suspended from the grid-patterned rail and the suspender may be suspended from the intersection between the first rails and the second rails included in the grid-patterned rail. The placement sections may be provided on both sides of the scaffold. The scaffold may be formed laterally and longitudinally to cross over the plurality of cells in a plan view. Further, the scaffold may be provided ranging from an outer edge to a center of the frame in a plan view. The frame may be an aggregate of a plurality of single frames disposed adjacent to each other and the scaffolds of respective adjacent single frames may be formed adjacent to each other. A plurality of the placement sections are provided in the single frames and the number of the placement sections may be larger than the number of cells surrounded by the single frames in a plan view. The placement sections may be collectively provided in a predetermined area included in the single frames and the scaffold may be provided in an area other than the predetermined area in a plan view.

The single frames may include, as the scaffold, a first scaffold being horizontally longitudinal in the first direction and a second scaffold horizontally longitudinal in the second direction. A passage width of the first scaffold may be shorter than the length of the placement section in the second direction and a passage width of the second scaffold may be shorter than a length of the placement section in the first direction. Both ends of each of the first scaffold and the second scaffold may extend to the vicinities of outer edges, respectively, of the frame.

A storage system is used in our transport system to store an article, the transport system including a grid-patterned rail and an overhead transport vehicle. The grid-patterned rail includes a plurality of first rails extending in a first direction and a plurality of second rails extending in a second direction different from the first direction and intersecting with the first rails. The grid-patterned rail forms a plurality of cells with the plurality of first rails and the plurality of second rails. The overhead transport vehicle travels along the grid-patterned rail. The storage system includes a suspender suspended from the grid-patterned rail and a frame that surrounds at least one of the cells in a plan view and is provided below the suspender. A placement section onto which an article is placed by the overhead transport vehicle and a scaffold serving as a walkway that allows an operator to walk thereon are provided within the frame below the cells.

The transport and storage systems enable an operator to easily access and perform maintenance work on the overhead transport vehicle, the grid-patterned rail, and the article, at the article storage suspended from the grid-patterned rail.

The frame is formed to surround the plurality of cells in a plan view and the scaffold is formed within the frame to cross over the plurality of cells in a plan view so that the storage onto which articles are placed by the overhead transport vehicle can have a larger space and an operator can access the area within the frame. The overhead transport vehicle travels with the main body being suspended from the grid-patterned rail and the suspender is suspended from the intersection between the first rails and the second rails in the grid-patterned rail so that the suspender can be disposed without preventing the overhead transport vehicle from traveling and the frame can be installed. The placement sections are provided on both sides of the scaffold so that an operator can easily access and perform maintenance work on the placement sections from the scaffold. The scaffold is laterally and longitudinally formed to cross over the plurality of cells in a plan view so that an operator can easily access each part of the grid-patterned rail, using the scaffold. The scaffold is provided ranging from the outer edge to the center of the frame in a plan view so that an operator can easily access the center area of the frame. The frame is an aggregate of single frames disposed adjacent to each other, and further the scaffolds of respective adjacent single frames are formed adjacent to each other so that the frame is formed as an aggregate of the single frames and the rigidity of the frame can be ensured. The plurality of single frames are provided adjacent to each other so that the single frames can be densely provided. The scaffolds of the single frames are formed adjacent to each other so that an operator can easily move onto an adjacent scaffold. A plurality of the placement sections are provided within the single frames and the number of the plurality of placement sections is larger than the number of cells surrounded by the single frames in a plan view so that the placement sections can be densely provided. The plurality of placement sections are collectively provided in a predetermined area within the single frames in a plan view, and the scaffold is provided in an area other than the predetermined area within the single frames so that the placement sections can be densely provided and an area with a sufficient size for installing the scaffolds can be ensured.

The single frames include, as the scaffold, the first scaffold being horizontally longitudinal in the first direction and the second scaffold being horizontally longitudinal in the second direction and perpendicular to the first direction so that the scaffold is provided in two directions. This structure enables the scaffold to be formed more effectively within the frame than a structure of the scaffold being provided in one direction only. The passage width of the first scaffold is shorter than the length of the placement section in the second direction and the passage width of the second scaffold is shorter than the length of the placement section in the first direction so that the longitudinal space within the frame, in which the placement section cannot be installed, can still be used as a scaffold. Both ends of each of the first scaffold and the second scaffold extend to the vicinities of outer edges, respectively, of the frame so that an operator can easily access the scaffold inside the frame from outside the frame.

DESCRIPTION OF REFERENCE SIGNS

Figure 1:
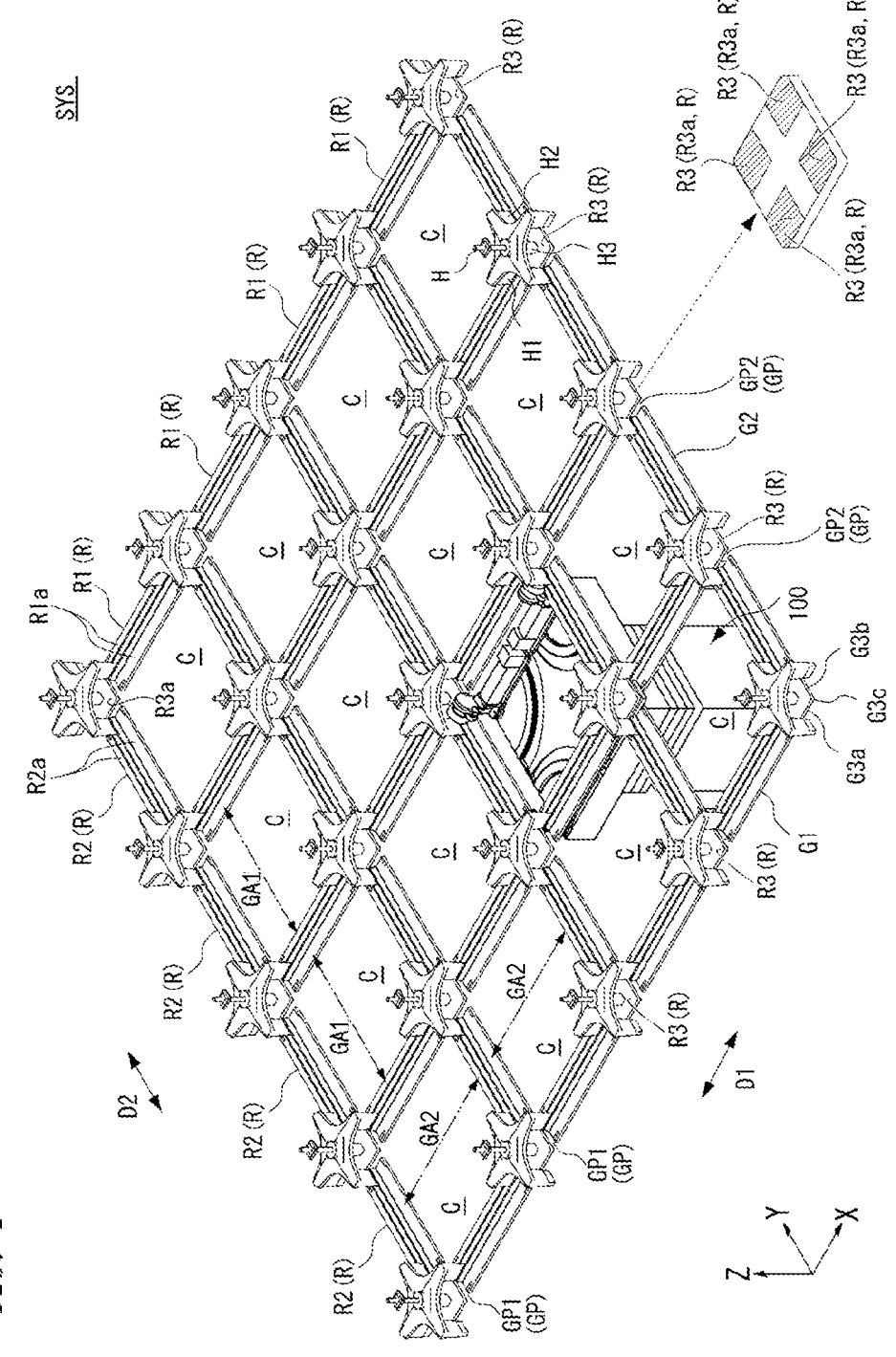
FIG. 1 is a perspective view of a transport system according to a first preferred example.

SYS, SYS2: Transport system
10: Main body
11: Sliding mechanism
12: Rotation unit
12a: Rotating member
12b: Rotation driving portion
13: Article holder
13a: Claw
13b: Suspending member
14: Elevating driver
17: Upper unit
17a: Upper surface
18: Transfer unit
20: Travel unit
21: Traveling wheel
22: Auxiliary wheel
30: Coupler
31: Supporter
32: Connector
33: Traveling driver
34: Direction changing mechanism
35: Drive source
36: Pinion gear
37: Rack
50: Controller
60, 60A: Storage
60U: Storage unit
61: Suspender
61A: Connection portion
61B: Bar-shaped portion
61C: Fixing portion
62: Coupling member
62A: Windows
62B: Connection portion
63: Frame
63U: Single frame
64: Placement section
64A: Bar-shaped member
65: Scaffold

65A: First scaffold
65B: Second scaffold
100: Overhead transport vehicle
AR1 to AR8: Area
C: Cell
GP: Gap
D1: First direction
D2: Second direction
R: Grid-patterned rail
R1: First rail
R2: Second rail
R3: Intersection
G1: First guide surface
G2: Second guide surface
G3*a*: First connection guide surface
G3*b*: Second connection guide surface
G3*c*: Continuous surface
U: Operator

DETAILED DESCRIPTION

Hereinafter, preferred examples will be described with reference to the drawings. However, this disclosure is not limited to the below-described examples. For detailed explanation of the examples, the drawing is partially enlarged or highlighted to change its scale in an appropriate manner. Directions in each of the following drawings will be described using an XYZ coordinate system. In this XYZ coordinate system, a plane horizontal to a horizontal plane is referred to as an XY plane. A direction along this XY plane is an X direction and a direction perpendicular to the X direction is a Y direction. The traveling direction of an overhead transport vehicle 100 can be changed from the direction shown in the following drawings to another direction, for example, the overhead transport vehicle may travel in a curved direction. A direction perpendicular to the XY plane is referred to as a Z direction. For each of the X direction, the Y direction, and the Z direction in the drawings, the direction indicated by an arrow is + direction, while the opposite direction thereof is − direction. The direction to pivot around a vertical axis or a Z axis is referred to as a θZ direction.

First Preferred Example

Figure 2:
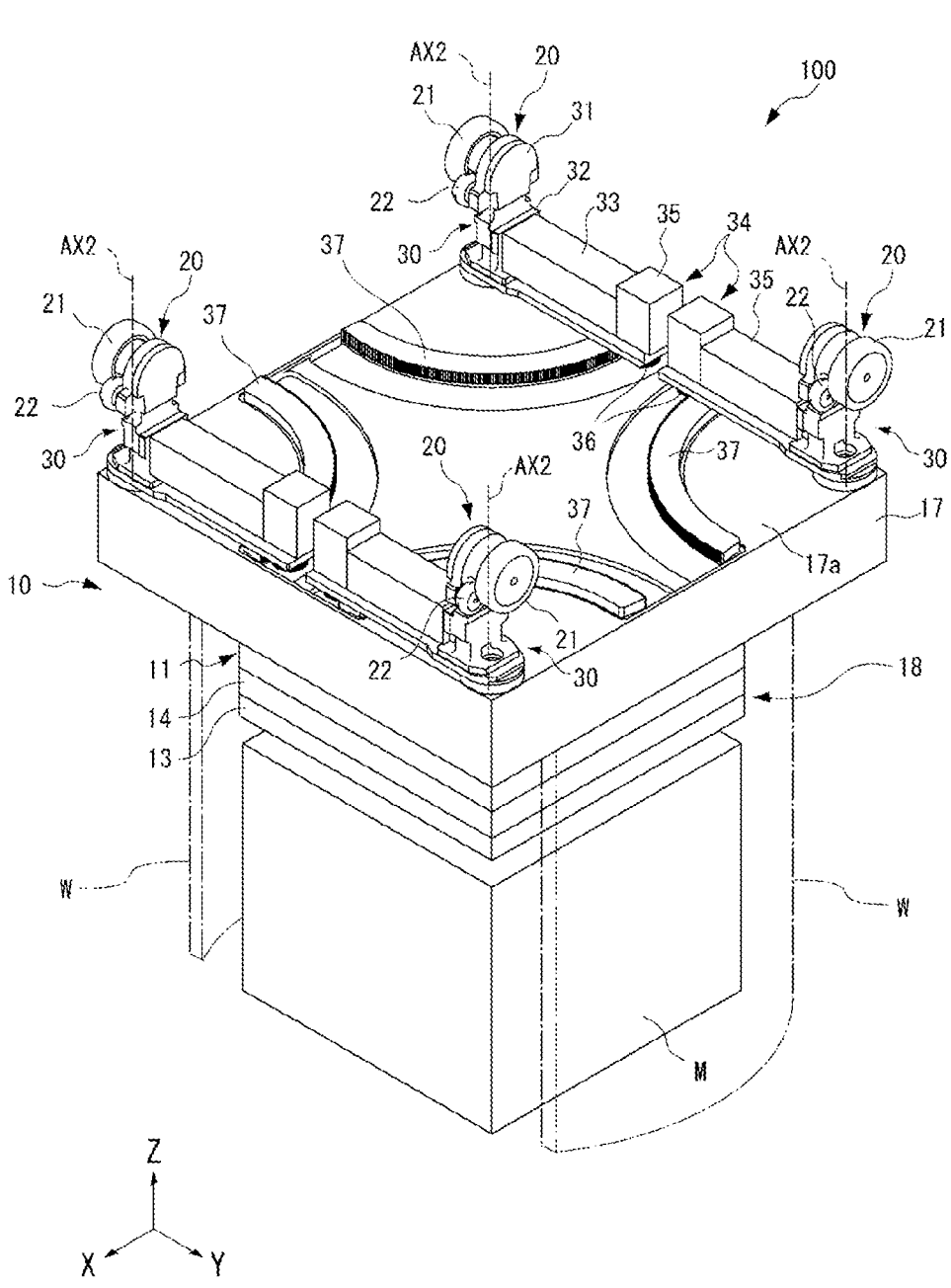
FIG. 2 is a perspective view of an example of an overhead transport vehicle.
Figure 3:
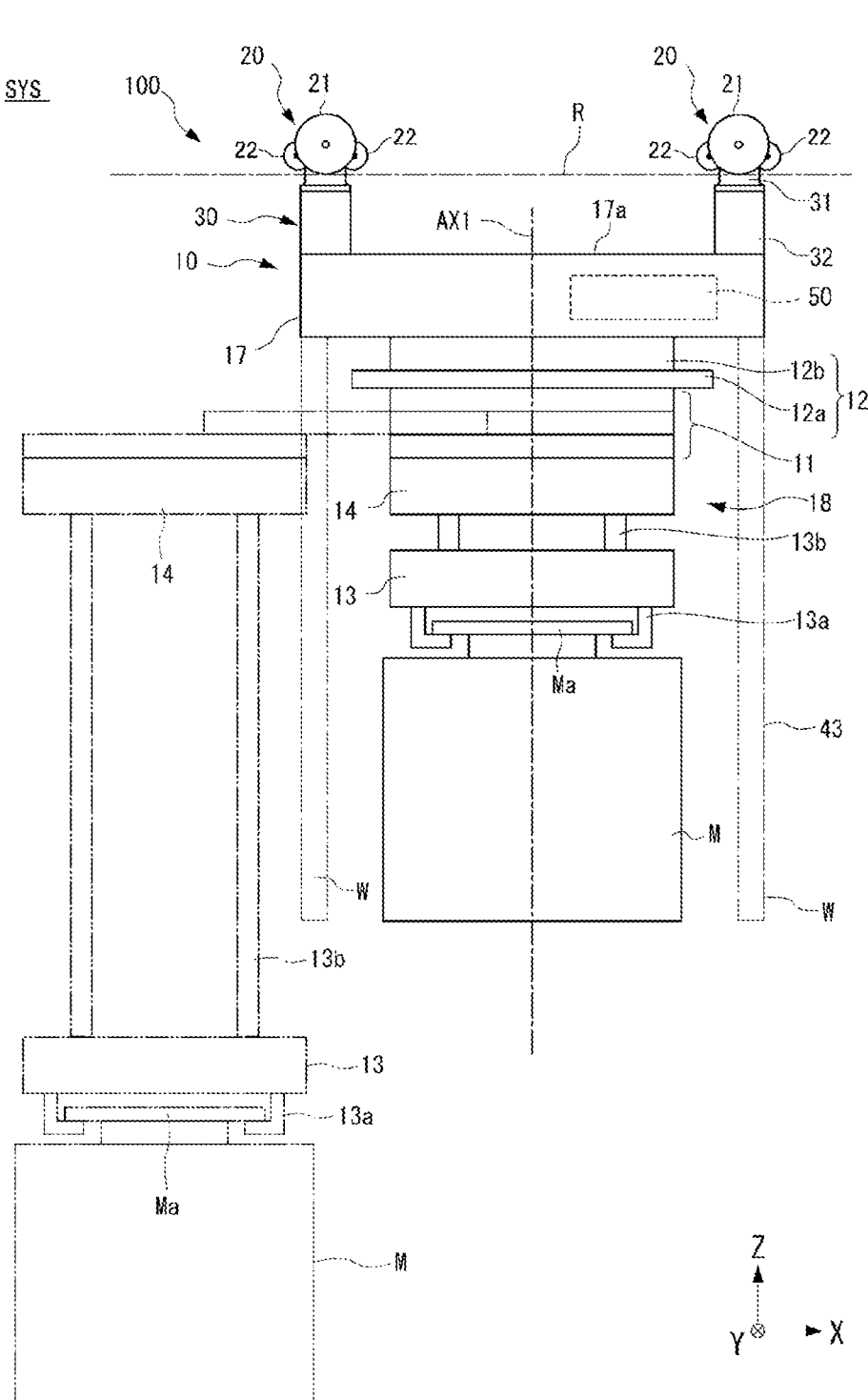
FIG. 3 is a side view of an example of the overhead transport vehicle.

FIG. 1 is a side view showing a transport system SYS according to a first preferred example. The drawing indicated by the arrow in the FIG. 1 shows an enlarged view of an intersection R3. FIG. 2 is a perspective view of an overhead transport vehicle 100 used in the transport system SYS shown in FIG. 1. FIG. 3 is a side view of the overhead transport vehicle 100 according to the first preferred example. As shown in FIG. 1, the overhead transport vehicle 100 travels along a rail R of the transport system SYS to transport an article M such as FOUP for accommodating semiconductor wafers or a reticle Pod for accommodating reticles.

The transport system SYS is a system for transporting articles M with the overhead transport vehicle 100, for example, in a clean room of semiconductor manufacturing facility. For example, a plurality of overhead transport vehicles 100 may be used in the transport system SYS. Transporting the articles M with a plurality of overhead transport vehicles 100 enables a highly dense transportation, improving the transport efficiency of transporting the articles M.

A rail R, which is a form of a rail, is laid on or in the vicinity of a ceiling of a facility such as a clean room. The rail R is a grid-patterned rail having a plurality of first rails R1, a plurality of second rails R2, and a plurality of intersections R3. Hereinafter, the rail R is referred to as a grid-patterned rail R. Each of the first rails R1 extends along the X direction (first direction D1). The first rails R1 are arranged such that the distance (GA1) between the first rails R1 in the Y direction (second direction D2) is constant or substantially constant. Each of the second rails R2 extends along the second direction D2 different from the first direction D1. The second rails R1 are arranged such that the distance (GA2) between the second rails R2 in the X direction (first direction D1) is constant or substantially constant. The second rails R2 intersect with the first rails R1, respectively. The grid-patterned rail R is formed in a grid pattern in a plan view with the first rails R1 and the second rails R2. The grid-patterned rail R forms a plurality of cells C with the first rails R1 and the second rails R2. The first direction D1 and the second direction D2 are at right angle to each other. The first rails R1 and the second rails R2 are provided perpendicular to each other but not to directly intersect with each other. The intersection R3 is disposed at the intersection part of the first rail R1 and the second rail R2. The intersection R3 is adjacent to the first rail R1 in the first direction D1 and to the second rail R2 in the second direction D2. The intersection R3 is a connection rail for connecting the first rail R1 and the second rail R2, connecting between the first rails R1, and connecting between the second rails R2. The intersection R3 is a rail that is also used when the overhead transport vehicle 100 travels along the first rail R1, when the overhead transport vehicle 100 travels along the second rail R2, when the overhead transport vehicle 100 travels from the first rail R1 to the second rail R2, and when the overhead transport vehicle 100 travels from the second rail R2 to the first rail R1. When seen from +Z direction in a plan view, the intersection R3 is formed with a rectangular plate member and provided at each of the four corners of the rectangular plate member as shown in the hatching area in FIG. 1. In the grid-patterned rail R, the plurality of first rails R1 and the plurality of second rails R2 are provided perpendicular to each other so that a plurality of cells C (grid cells, cells) are formed adjacent to each other in a plan view. As shown in FIG. 1, each of the cells C is surrounded by two of the first rails R1 adjacent to each other in a second direction D2 and two of the second rails R2 adjacent to each other in a first direction D2 in a plan view. FIG. 1 shows a part of the grid-patterned rail R, and in the grid-patterned rail R the same structures as shown in the figure are continuously formed in the first direction D1 (X direction) and the second direction D2 (Y direction).

The first rail R1, the second rail R2, and the intersection R3 are suspended by a suspending member H as shown in FIG. 1 from the ceiling (not shown). The suspending member H includes a first part H1 for suspending the first rail R1, a second part H2 for suspending the second rail R2, and a third part H3 for suspending the intersection R3. The first part H1 and the second part H2 are each attached at both sides of the third part H3.

The first rail R1, the second rail R2, and the intersection R3 include traveling surfaces R1*a*, R2*a*, and R3*a*, respectively, on which a traveling wheel 21 (described later) of the overhead transport vehicle travels. Two of the traveling surfaces R1*a* extending along in the first direction D1 are provided on one of the first rail R1 side by side in the second direction D2. Two of the traveling surfaces R2*a* extending along in the second direction D2 are provided on one of the second rail R2 side by side in first direction D1. When the overhead transport vehicle 100 travels in the first direction D1, the traveling wheel 21 travels on the pair of traveling surfaces R1a of the first rail R1 disposed adjacent to each other in the second direction D2. When the overhead transport vehicle 100 travels in the second direction D2, the traveling wheel 21 travels on the pair of traveling surfaces R2a of the second rail R2 disposed adjacent to each other in the first direction D1. A distance GA1 between the pair of the first rails R1 disposed adjacent to each other and a distance GA2 between the pair of the second rails R2 disposed adjacent to each other are the same or substantially the same. A first gap GP1 is formed between the first rail R1 and the intersection R3 and a second gap GP2 is formed between the second rail R2 and the intersection R3. When the overhead transport vehicle 100 travels on the second rail R2 and crosses the first rail R1, a coupler 30 (to be described later) being a part of the overhead transport vehicle 100 passes through the first gap GP1. When the overhead transport vehicle 100 travels on the first rail R1 and crosses the second rail R2, the coupler 30 of the overhead transport vehicle 100 passes through the second gap GP2. Accordingly, the first gap GP1 and the second gap GP2 (collectively a gap GP) each have a width that allows the coupler 30 of the overhead transport vehicle 100 to pass therethrough. The first rail R1, the second rail R2 and the intersection R3 are provided along the same or substantially the same horizontal plane. The traveling surface R1a of the first rail R1, the traveling surface R2a of the second rail R2, and the traveling surface R3a of the intersection R3 are disposed on the same or substantially the same horizontal plane.

The grid-patterned rail R includes a first guide surface G1 and a second guide surface G2. The first guide surface G1 is provided along the first rail R1. The first guide surface G1 is provided on the side of the first rail R1. The second guide surface G2 is provided along the second rail R2. The second guide surface G2 is provided on the side of the second rail R2.

The intersection R3 has a first connection guide surface G3a, a second connection guide surface G3b, and a continuous surface G3c. The first connection guide surface G3a is provided at the same or substantially the same height in the same or substantially the same direction as the first guide surface G1. That is to say, the first connection guide surface G3a and the first guide surface G1 are provided on the same plane. The second connection guide surface G3b is provided at the same or substantially the same height in the same or substantially the same direction as the second guide surface G2. That is to say, the second connection guide surface G3b and the second guide surface G2 are provided on the same plane. The continuous surface G3c is formed to continuously connect the first connection guide surface G3a with the second connection guide surface G3b. The continuous surface G3c is a curved surface that smoothly connects the first connection guide surface G3a and the second connection guide surface G3b.

As shown in FIGS. 2 and 3, the overhead transport vehicle 100 includes a main body 10, travel units 20, couplers 30, and a controller 50 as shown in FIG. 3. The controller 50 comprehensively controls operations of each part of the overhead transport vehicle 100. The controller 50 is installed in the main body 10; however, it may be installed outside the main body 10. The main body 10 is arranged below the grid-pattern rail R (−Z direction). The overhead transport vehicle 100 travels while the main body 10 is suspended from the grid-patterned rail R. The main body 10 is formed, for example, in a rectangular shape in a plan view. The main body 10 is formed in a size that fits in a cell C as shown in FIG. 1 of the grid-patterned rail R in a plan view. This ensures an enough space for the overhead transport vehicles 100 traveling respectively on the first rail R1 and the second rail R2 adjacent to each other to pass one another. The main body 10 includes an upper unit 17 and a transfer unit 18. The upper unit 17 is suspended from the travel units 20 via the coupler 30. The upper unit 17 is, for example, of a rectangular shape as seen in a plan view and has four corners on an upper surface 17a.

The main body 10 has the traveling wheel 21, the coupler 30, and a direction changing mechanism 34 at each of the four corners. In this configuration, the traveling wheels 21 arranged at the four corners enable stable suspension of the main body 10 and stable traveling of the main body 10 also.

The transfer unit 18 is provided below the upper unit 17. The transfer unit 18 can rotate around a rotation axis AX1 in Z direction (vertical direction). The transfer unit 18 has an article holder 13 to hold an article M, an elevating driver 14 to move the article holder 13 up and down in the vertical direction, a sliding mechanism 11 to slide the elevating driver 14 horizontally, and a rotation unit 12 to hold the sliding mechanism 11. The article holder 13 suspends and holds an article M by gripping a flange portion Ma of the article M. The article holder 13 is, for example, a chuck having a claw 13a movable horizontally. The claw 13a is inserted under the flange portion Ma of the article M to lift up the article holder 13a so that the article holder 13 can hold the article M. The article holder 13 is connected to a suspending member 13b such as a wire or a belt.

The elevating driver 14 such as a hoist, reels out the suspending member 13b to lower the article holder 13 and reel in the suspending member 13b to lift up the article holder 13. The elevating driver 14 is controlled by the controller 50 to lift the article holder 13 up or down at a predetermined speed. Further, the elevating driver 14 is controlled by the controller 50 to hold the article holder 13 at a targeted level.

The sliding mechanism 11 includes, for example, a plurality of movable plates stacked in Z direction. The movable plates are capable of moving relatively to the X direction. The elevating driver 14 is attached to the bottommost movable plate. The sliding mechanism 11 moves the movable plates using a driving device (not shown) to slide out the elevating driver 14 and the article holder 13, which are attached to the bottommost movable plates, in the horizontal direction perpendicular to the traveling direction of the overhead transport vehicle 100.

The rotation unit 12 is provided between the sliding mechanism 11 and the upper unit 17. The rotation unit 12 includes a rotating member 12a and a rotating driving portion 12b. The driving member 12a is provided to be rotatable around the axis in the vertical direction. The rotating member 12a supports the sliding mechanism 11. The rotation driving portion 12b, for example, an electric motor, drives the rotating member 12a to rotate around the rotation axis AX1. The rotation unit 12 is capable of rotating the rotating member 12a by the driving force from the rotation driving portion 12b and rotating the sliding mechanism 11 (elevating driver 14 and article holder 13) around the rotation axis AX1.

As shown in FIG. 2, a cover W may be provided to surround the transfer unit 18 and the article M held by the transfer unit 18. The cover W is of a cylindrical shape with an opened bottom edge and has an opening through which the movable plates of the sliding mechanism 11 protrudes. The top edge of the cover W is attached to the rotating member 12a of the rotation unit 12 and the cover W rotates around the rotation axis AX1 along with the rotation of the rotating member 12a.

The travel unit 20 includes a traveling wheel 21 and auxiliary wheels 22. The traveling wheel 21 is arranged at each of four corners of the upper surface 17a of the upper unit 17 (main body 10). Each traveling wheel 21 is attached to an axle provided on the coupler 30. The axles are provided parallel or substantially parallel to each other along the XY plane. The traveling wheels 21 are each rotationally driven by the driving force of a traveling driver 33 (to be described later). The traveling wheels 21 each roll on the traveling surface R1a, R2a, and R3a of the first rail R1, the second rail R2, and the intersection R3 of the rail R, causing the overhead transport vehicle 100 to travel. The configuration is not limited to a configuration in which all of the four traveling wheels 21 are driven to rotate by the drive force of the traveling driver 33 and may be a configuration in which only some of the four traveling wheels 21 are driven to rotate.

The traveling wheel 21 is provided pivotably around a pivot AX2 in θZ direction. The direction changing mechanism 34 (to be described later) pivots the traveling wheel 21 in the θZ direction, which enables the traveling vehicle 100 to change its traveling direction. The auxiliary wheels 22 are disposed each at the front and rear of the traveling wheel 21 in the traveling direction. As with the traveling wheel 21, each of the auxiliary wheels 22 is capable of rotate along the XY plane around each of the parallel or substantially parallel axles. Each auxiliary wheel 22 is provided such that the bottom edge thereof is higher than the bottom edge of the traveling wheel 21. Accordingly, when the traveling wheel 21 travels on the traveling surface R1a, R2a, or R3a, the auxiliary wheels 22 do not come into contact with the traveling surface R1a, R2a, or R3a. When the traveling wheel 21 passes through the gap GP as shown in FIG. 1, the auxiliary wheels 22 come into contact with the traveling surface R1a, R2a, or R3a to thereby prevent the traveling wheel 21 from getting caught in the gap. The configuration is not limited to a configuration in which two auxiliary wheels 22 are provided for a single traveling wheel 21 and, for example, may be a configuration in which a single auxiliary wheel 22 is provided for a single traveling wheel 21, or no auxiliary wheel 22 is provided.

As shown in FIG. 3, the coupler 30 couples the upper unit 17 of the main body 10 with the travel unit 20. The coupler 30 is provided at each of four corners on the upper surface 17a of the upper unit 17 of the main body 10. The main body 10 is suspended from the travel unit 20 with the coupler 30 and arranged below the grid-patterned rail R. The coupler 30 includes a supporter 31 and a connector 32. The supporter 31 rotatably supports a rotation axis of the traveling wheel 21 and a rotation axis of the auxiliary wheels 22. The positions of the traveling wheel 21 and the auxiliary wheels 22 are maintained relative to each other by the supporter 31. The supporter 31 is formed, for example, in a plate shape with a thickness that allows it to pass through the gap GP as shown in FIG. 1.

The connector 32 extending downwards from the supporter 31 couples with the upper surface 17a of the upper unit 17 and holds the upper unit 17. The connector 32 has a transmission mechanism, which transmits the traveling force of the traveling driver 33 (described later) to the traveling wheel 21. In the transmission mechanism, a chain or a belt may be used, or a gear train may be used. The connector 32 is provided pivotably around the pivot AX2 in the θZ direction, which enables the traveling wheel 21 to pivot the pivot AX2 via the supporter 31 in the θZ direction.

The coupler 30 shown in FIG. 2 is provided with the traveling driver 33 and the direction changing mechanism 34. The traveling driver 33 is attached to the connector 32. The traveling driver 33 is a drive source to drive the traveling wheel 21 such as an electric motor. Each of four traveling wheels 21 is a driven wheel that is driven by the traveling driver 33. The four traveling wheels 21 are controlled by the controller 50 to rotate at the same or substantially the same speed. If any of the four traveling wheels 21 is not used as a driven wheel, the connector 32 of the traveling wheel 21 that is not used as a driven wheel is not attached to the traveling driver 33.

The direction changing mechanism 34 causes the connector 32 of the coupler 30 to pivot around the pivot AX, which enables the traveling wheel 21 to pivot around the pivot AX2 in the θZ direction. As a result, the traveling direction of the overhead transport vehicle 100 can be switched from a first state to a second state or from the second state to the first state. The first state is a state in which the overhead transport vehicle 100 travels in the first direction D1 and the second state is a state in which the overhead transport vehicle 100 travels in the second direction D2.

The direction changing mechanism 34 includes a drive source 35, a pinion gear 36, and a rack 37. The drive source 35 is attached to the side of the traveling driver 33 apart from the pivot AX2. For example, an electric motor is used as the drive source 35. The pinion gear 36 is attached to the bottom surface of the drive source 35 and is rotationally driven in the θZ direction by the driving force generated at the drive source 35. The pinion gear 36 is in a circular shape in a plan view and includes a plurality of teeth in a circumferential direction of outer periphery. The rack 37 is fixed to the upper surface 17a of the upper unit 17. The rack 37 is provided at each of four corners on the upper surface 17a of the upper unit 17 in a circular-arc shape (fan-shaped) centered on the pivot AX2 of the traveling wheel 21. The rack 37 includes a plurality of teeth that engage with the teeth of the pinion gear 36 in a circumferential direction of outer periphery.

The pinion gear 36 and the rack 37, which engage with each other, are arranged. The pinion gear 36 rotates in the θZ direction so that the pinion gear 36 moves along the outer circumference of the rack 37 in a circumferential direction centered on the pivot AX2. Movement of the pinion gear 36 causes the connector 32 to pivot and then, causes the traveling driver 33 and the direction changing mechanism 34 to pivot with the pinion gear 36 in the circumferential direction centered on the pivot AX2.

The pivoting of the direction changing mechanism 34 causes each of the traveling wheel 21 and the auxiliary wheel 22 disposed at each of four corners of the upper surface 17a to pivot in the θZ direction within a range of 90 degrees centered on the pivot AX2. The controller 50 controls how the direction changing mechanism 34 drives. The controller 50 may instruct the four traveling wheels 21 to pivot with the same timing or with different timings. By causing the traveling wheel 21 and the auxiliary wheels 22 to pivot, the traveling wheel 21 shifts from the state of being in contact with one of the first rail R1 and the second rail R2 to the state of being in contact with the other. In other words, the direction of the rotation axis of the traveling wheel 21 shifts from one of the first direction D1 and the second direction D2 to the other. As a result, it is possible to switch between the first state where the traveling direction of the transport vehicle V is the first direction D1 (X direction) and the second state where the traveling direction is the second direction D2 (Y direction).

Figure 4:
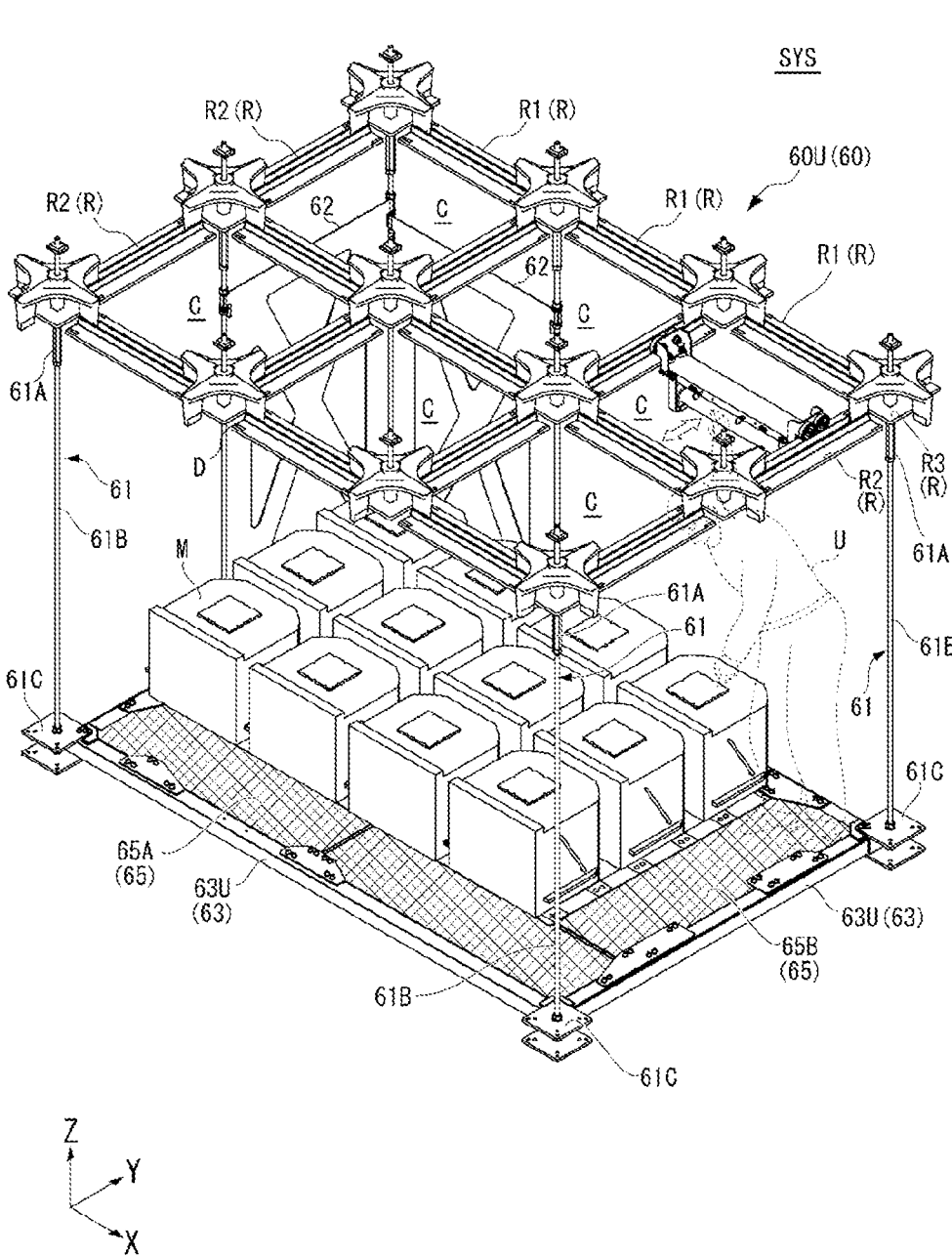
FIG. 4 is a perspective view of an example of a storage system.
Figure 5:
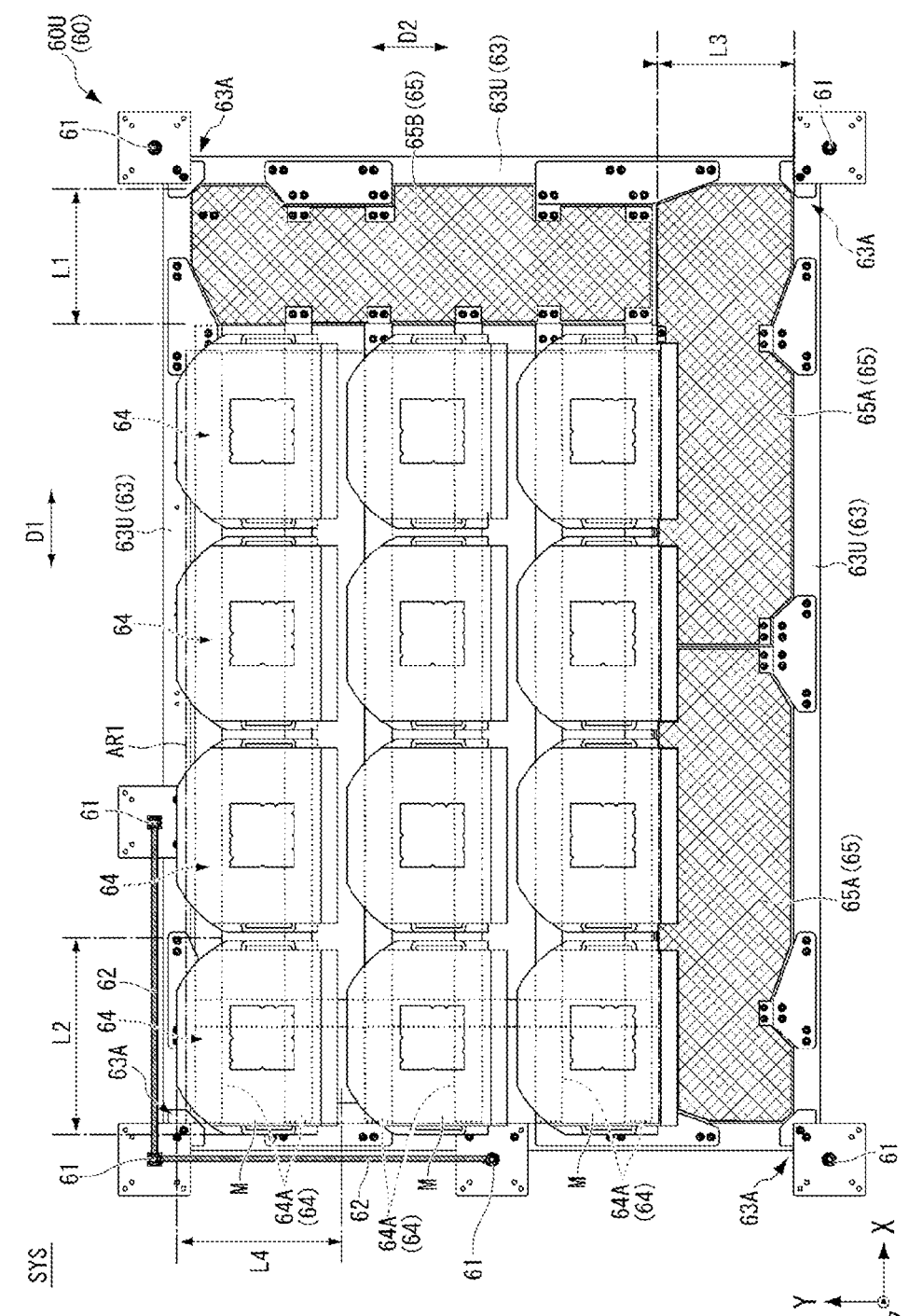
FIG. 5 is a top view of an example of the storage system.

FIG. 4 is a perspective view of a storage 60 according to the first preferred example. FIG. 5 is a top view of an example of the storage system. The transport system SYS includes the storage 60 for storing the article M. The storage 60 is an overhead buffer (OHB). The storage 60 is provided below the grid-patterned rail R. In this preferred example, the storage 60 will be described as a storage unit 60U being a single unit. The storage unit 60U (storage 60) includes suspenders 61, coupling members 62, single frames 63U (frame 63), placement sections 64 on which the article M is placed (refer to FIG. 5), and a scaffold 65. The placement sections 64 and the scaffold 65 are provided within the single frames 63U (frame 63) below the cells C. One or more storage units 60U can be provided at any location below the grid-patterned R. The storage unit 60U is attachable to and detachable from the grid-patterned rail R.

The storage unit 60U is formed to surround at least one cell C in a plan view. The circumferential shape of the storage unit 60U approximately matches that of the plurality of cells C of the grid-patterned rail R as seen in a plan view. This enables the storage unit 60 to be provided without preventing the overhead transport vehicle 100 from traveling. In the illustrated configuration, as seen in a plan view, the shape and size of the storage unit 60U approximately matches the overall circumferential shape and size of the 3×2 cells C, that is, three cells C in the X direction and two cells C in the Y direction (3×2 cells). The storage unit 60U is not limited to the above example and may be formed in any shape. For example, the circumferential shape and size of the storage unit 60U may approximately match the overall circumferential shape and size of the cells C (m×n), that is, m (m being an integer more than or equal to 1) pieces of cells C in the X direction and n (n being an integer more than or equal to 1) pieces of cells C in the Y direction as seen in a plan view. Another example of the shape of the storage unit 60U will be described later.

Figure 6:
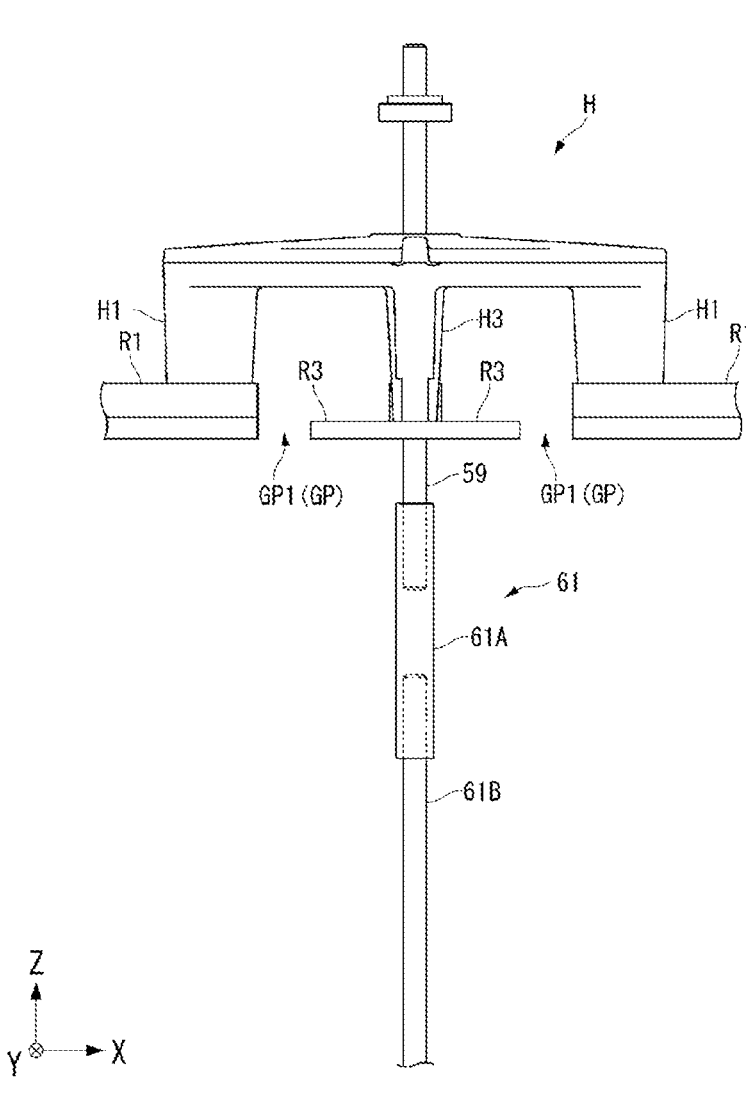
FIG. 6 is a side view of a connection between a grid-patterned rail and a suspender.
Figure 7:
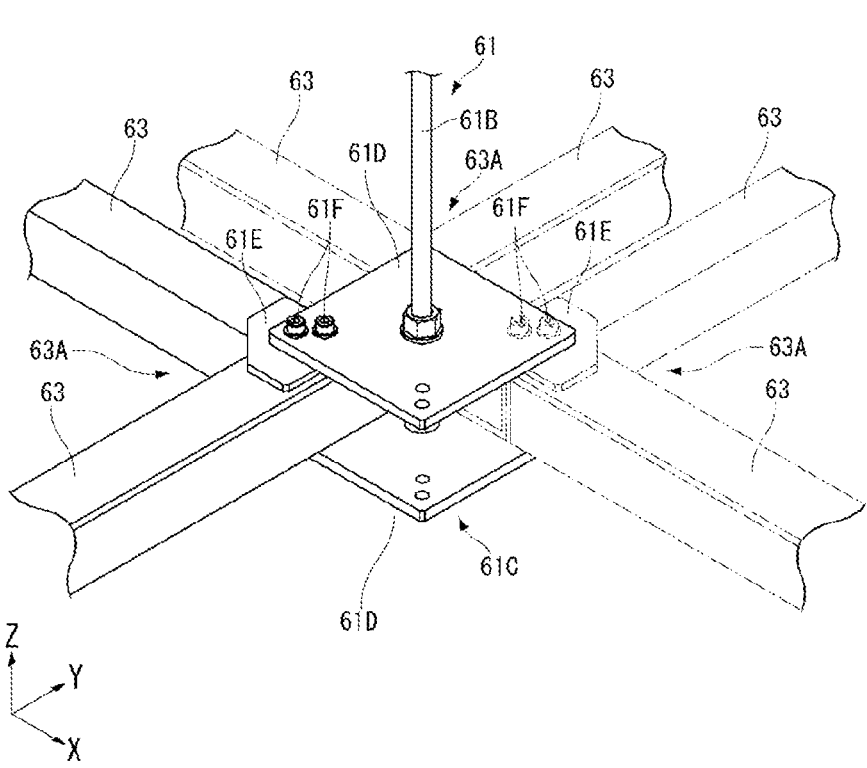
FIG. 7 is a perspective view of a connection between the suspender and a frame.

The storage unit 60U is suspended from the grid-patterned rail R by a plurality of the suspenders 61. Each of the suspenders 61 includes a connection portion 61A, a bar-shaped portion 61B, and a fixing portion 61C as shown in FIG. 4. All of the suspenders 61 have the same configurations. FIG. 6 is a side view seen from the −Y direction, showing a connection between the grid-patterned rail R and the suspender 61. FIG. 7 is a perspective view showing a connection between the suspender 61 and the frame. The suspender 61 is suspended from the intersection R3 as shown in FIG. 6. The suspender 61 is provided at a position at which it does not interfere with the overhead transport vehicle 100 when the overhead transport vehicle 100 travels. The connection portion 61A is connected to a connection member 59 provided below the intersection R3. The connection member 59 is provided in the center of the intersection R3 in a plan view and the connection portion 61A is connected to the center of the intersection R3 in a plan view. The connection portion 61A and the intersection R3, which have a mechanism such as a bolt and a nut, are attachable to and detachable from each other.

A bar-shaped portion 61B is a member extending in a straight line. The bar-shaped portion 61B is provided in the vertical direction. The upper edge of the bar-shaped portion 61B is connected to the bottom edge of the connection portion 61A. The connection portion 61A and the bar-shaped portion 61B, which have a mechanism such as bolt and nut, are attachable to and detachable from each other.

The fixing portion 61C is provided at the bottom edge of the bar-shaped portion 61B (refer to FIG. 7). The single frames 63U are fixed to the fixing portion 61C. The fixing portion 61C includes two plate-shaped members 61D and fastening members 61F. Each of the single frames 63U is interposed between the two plate-shaped members 61D from above and below via an intervention member 61E and is fixed to the fixing portion 61C with the fastening members 61F. The two plate-shaped members 61D are fixed with the bar-shaped member 61B. A corner portion 63A of each of four single frames 63U can be fixed to the fixing portion 61C. With this configuration, the single frames 63U of at most four storage units U can be supported by one suspender 61. Accordingly, the plurality of the storage units 60U can be densely provided adjacent to each other. The fixing portion 61C and the bar-shaped portion 61B are attachable to and detachable from each other. The fixing portion 61C and the single frame 63U are attachable to and detachable from each other. According to the above configuration, the suspender 61 supports the single frames 63U being suspended from the intersection R3. According to the above configuration, the suspender 61 and the single frames 63U are attachable to and detachable from the intersection R3.

When the suspender 61 is suspended from the intersection R3 as above, the suspender 61 can be disposed without hindering the traveling operation of the overhead transport vehicle 100 to install the storage unit 60U. This preferred example is of a configuration such that the overhead transport vehicle 100 can travel through between the suspenders 61. The suspenders 61 are not limited to the above configuration and may be of another configuration. For example, the suspender 61 may be connected to the first rail R1 or the second rail R2.

The position and the number of the suspenders 61 are determined appropriately in accordance with the shape, size, or weight of each part of the storage unit 60 such as the single frame 63U or the placement section 64. In the illustrated example, the suspender 61 supports the single frames 63U evenly. A plurality of the suspenders 61 are provided at the portions that form the outer circumference of the storage unit 60U as seen in a plan view. Each of the suspenders 61 is provided at each corner and so forth of the rectangular outer circumstance of the storage unit 60U as seen in a plan view and is arranged to be rotationally symmetric about the center of the storage unit 61U as seen in a plan view. The positions of the suspenders 61 are not limited to the above example. For example, the suspenders may be provided inside the storage unit 61U as seen in a plan view.

Figure 8:
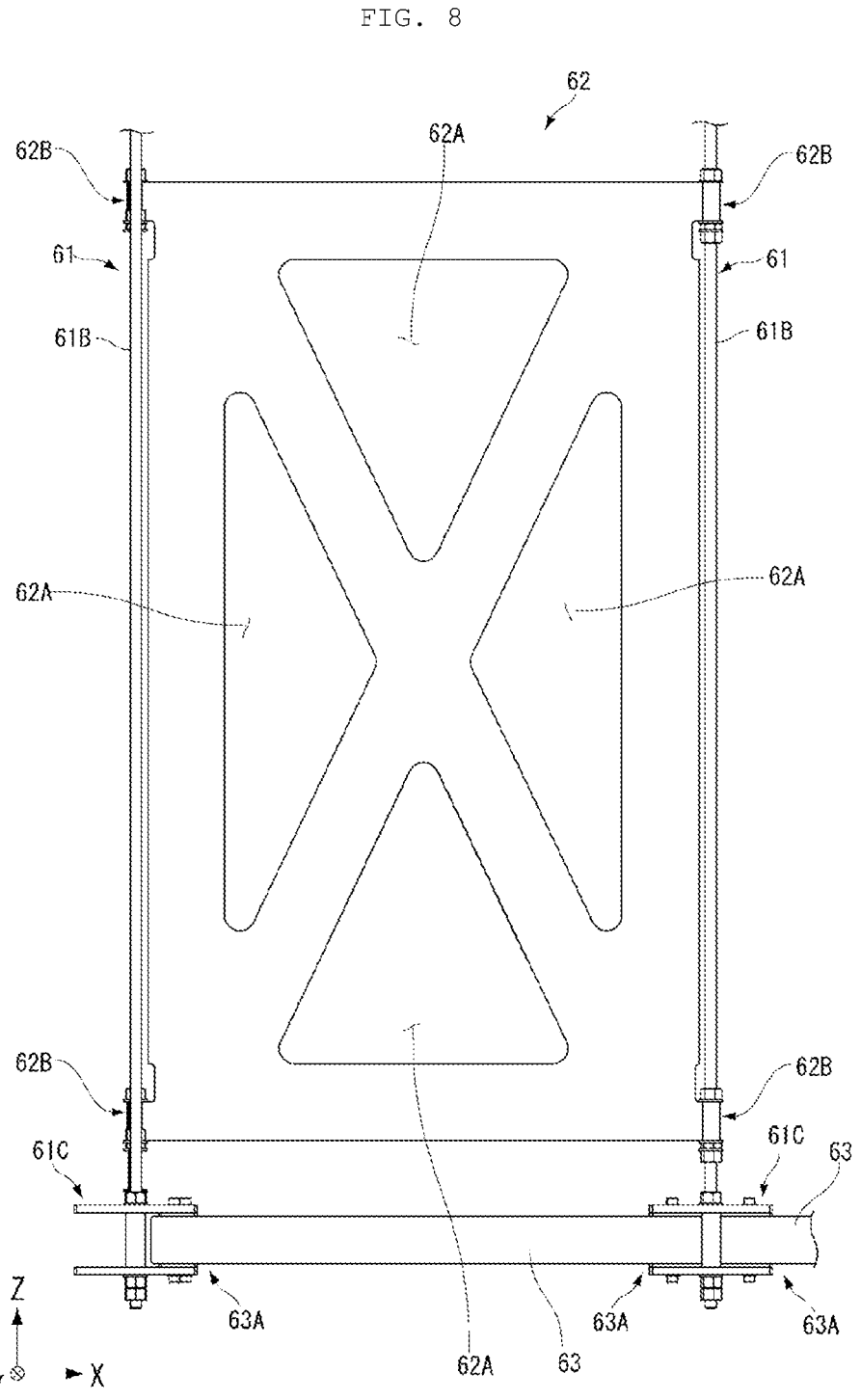
FIG. 8 is a side view of an example of a coupling member 62.

FIG. 8 shows an example of the coupling member 62 seen from −Y side. The coupling member 62 couples the adjacent suspenders 61 together. Coupling these adjacent suspenders 61 together enables restriction to the movement of the suspenders 61, thus suppressing the sway of the storage unit 60U. The shape of the coupling member 62 is in a rectangular shape having a plurality of windows 62A. With this configuration, the weight of the coupling member 62 is reduced while the strength thereof is maintained. In addition, the window 62A can suppress visibility degradation caused by the coupling member 62 blocking the visibility. The overhead transport vehicle 100 cannot pass through the coupling member 62, however, can move to each cell C adjacent to the coupling member 62.

The coupling member 62 is attachable to and detachable from the bar-shaped portion 61B of the suspender 61. The coupling member 62 includes a connection portion 62B connecting to the bar-shaped portion 61B. In the illustrated example, the connection portions 62B are provided at four corners of the coupling member 62.

Figure 9:
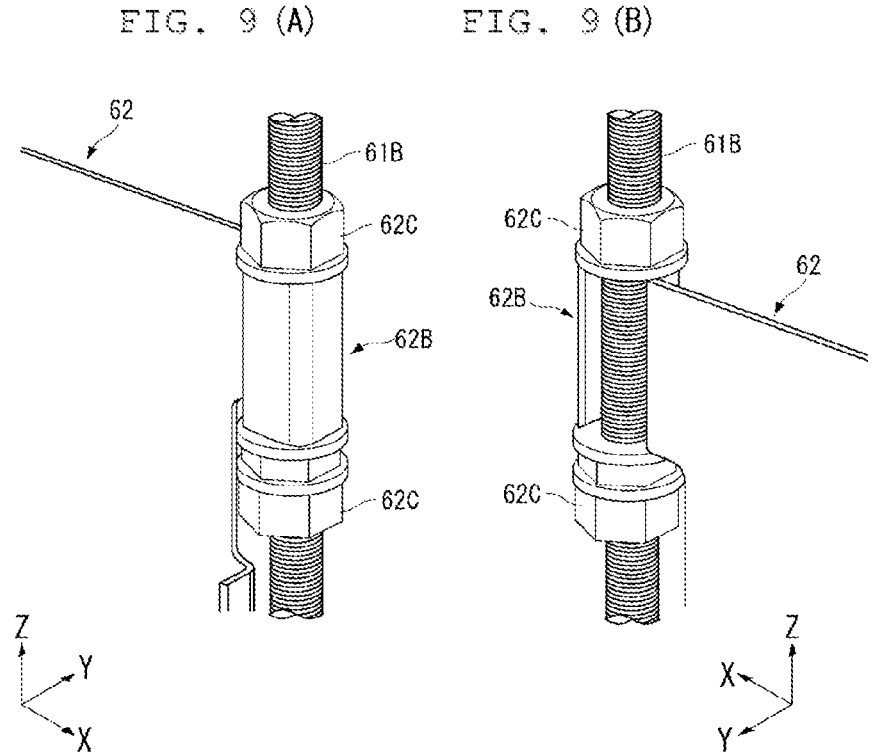
FIGS. 9(A) and (B) are perspective views of a connection between the coupling member and the suspender.

FIGS. 9(A) and 9(B) are perspective views showing a connection between the coupling member 62 and the suspender 61. FIG. 9(A) is a perspective view seen from the −Y side and FIG. 9(B) is a perspective view seen from the +Y side. FIGS. 9(A) and 9(B) show an enlarged view of one of the four connection portion 62B of the coupling member 62 shown in FIG. 8, located on the +Z and +X side, from two different directions.

The connection portion 62B is connected to a part of the bar-shaped portion 61B of the suspender 61. The connection portion 62B is connected to the bar-shaped portion 61B to cover the outer circumstance of the bar-shaped portion 61B. The connection portion 62B is detachable from the bar-shaped portion 61B. The connection portion 62B is vertically fixed to the bar-shaped portion 61B by being screwed from above and below by fixing members 62C such as bolts. With the above configuration, the coupling member 62 can be easily installed.

The configuration of the coupling member 62 is not limited to the configuration described above as long as it allows the suspenders 61 to be coupled with each other. Further, the coupling member 62 is optional and may be omitted.

The single frames 63U are a frame 63. The single frames 63U are used for constituting a storage unit 61U and are disposed at the bottom of the storage unit 60U as shown in FIG. 4. The single frames 63U are suspended from the grid-patterned rail R by the suspenders 61. As the above, the single frames 63U are suspended by a plurality of the suspenders 61. The single frames 63U are provided at the bottom of the suspenders 61. The single frames 63U are arranged below the position of the overhead transport vehicle 100 when it is traveling as shown by solid lines in FIG. 3. The single frames 63U serve as a base that supports respective parts of the storage unit 60U. The single frames 63U are disposed in a direction along the horizontal direction. Each of the single frames 63U is configured by a plurality of members.

The single frames 63U are formed to surround at least one cell C in a plan view. The single frames 63U are formed to surround a plurality of cells C in a plan view. The single frames 63U surrounds six (6) cells including three (3) cells C in the X direction and two (2) cells C in the Y direction (total six (6) cells) in a plan view. The outer circumference of the single frames 63U substantially coincides with the outer circumference of the plurality of cells C (six (6) cells in example) in a plan view. With this configuration, the storage unit 60U can be provided without preventing the overhead transport vehicle 100 from traveling.

The single frames 63U are arranged at least at the portion forming the outer circumference of the storage unit 60U in a plan view. The single frames 63U are disposed at least at four sides of rectangular outer circumference of the storage unit 60U in a plan view. The configuration of each of the single frames 63U is not limited to the configuration described above. For example, the outer circumference of the single frames 63U need not be of a rectangular shape in a plan view.

The placement section 64 as shown in FIGS. 4 and 5 will be now described. The storage unit 60U includes a plurality of placement sections 64 on which an article M can be placed. The article M is placed on each of the placement sections 64 by the overhead transport vehicle 100. Each of the placement sections 64 is provided inside the single frames 63U. The inside of the single frames 63U is an area within the single frames 63 in a plan view. Each placement section 64 is set to have the same size as that of the outer circumference of the article M in a plan view.

In the configuration of FIG. 5, the plurality of placement sections 64 are formed by a plurality of bar-shaped members 64A arranged parallel to each other in a horizontal direction. The bar-shaped members 64A are fixed to the single frames 63U. The bar-shaped member 64A serves as a beam of the single frame 63U. The top surface of each bar-shaped member 64A, which is planate, is a placement surface on which an article M is placed. An article M is supported by two of the bar-shaped members 64A from below. The article M is held on the placement section 64 by being supported by the two bar-shaped members 64A at the position displaced from the center thereof in the +Y direction and the position displaced from the center thereof in the −Y direction. The two bar-shaped members 64A are arranged paralleled to each other along the X direction. With the configuration in which the placement section 64 is formed by the above bar-shaped members 64A, compared to the configuration in which an article M is placed on a plate-shaped member, the weight of the storage unit 60U can be reduced and the vertical laminar flow (down flow) used for a clean room can be prevented from being blocked.

A positioning mechanism (not shown) such as a kinematic pin capable of positioning an article M is provided on the top surface of the bar-shaped member 64A. The positioning mechanism is provided at each of the placement sections 64. The article M is able to be positioned by the positioning mechanism and placed on the placement section 64.

A greater number of the placement sections 64 than the plurality of cells C surrounded by or within the single frames 63U in a plan view are provided. The number of the placement sections 64 is twelve in total, including four rows of the placement sections in the X direction and three columns of the placement sections in the Y direction (4×3). The maximum number of placement sections 64 that can be installed in an area within the single frames 63U are provided. With this configuration, the placement sections 64 can be densely provided.

A predetermined interval is provided between adjacent placement sections 64 to prevent the article M from colliding therewith when the article M is transported to the placement section 64 by the overhead transport vehicle 100. The plurality of placement sections 64 are collectively provided in a predetermined area AR1 within the single frames 63U. The area AR1 is a single continuous area. In the configuration of this preferred example, the area AR1 is formed in a rectangular shape as seen in a plan view. The plurality of placement sections 64 are collectively provided in the predetermined area AR1 so that the placement sections 64 can be densely provided and an area with a sufficient space for installing the scaffold 65 can be ensured. In the configuration of this example, the area AR1 is arranged at corners along the outer circumferences of the single frames 63U. This enables effective use of the space within the single frames 63U for the placement section 64 and the scaffold 65.

The size of the placement section 64 in a plan view is set based on the shape of the article M, and the area AR1 for the plurality of placement sections 64 is set to include the maximum number of placement sections 64. The overhead transport vehicle 100 is configured to fit within a single cells C of the grid patterned rail R in a plan view. Even the center of a placement sections 64 deviates from the center of the cell C in a plan view, the article M can still be placed on each placement section 64 by the sliding mechanism 11 of the overhead transport vehicle 100. As described above, the plurality of placement sections 64 according to this example are densely arranged regardless of cells C of the grid-patterned rail R.

The configuration of the placement section 64 is not limited to the configuration described above, as long as an article M can be placed thereon. For example, the area AR may be formed in any size and shape. Also, the placement section 64 is not limited to that composed of the bar-shaped members 64A. For example, the placement section 64 may be composed of plate-shaped members. Other configurations of the placement section 64 will be described later.

The scaffold 65 as shown in FIGS. 4 and 5 will be now described. The scaffold 65 is provided inside the single frames 63U. The scaffold 65 is formed to cross over the plurality of cells in a plan view. The scaffold 65 is a walkway that allows an operator U to walk thereon. The scaffold 65 is used as a scaffold for the operator U. For example, the scaffold 65 is used as a scaffold for the operator U to perform maintenance work on the transport system SYS. Examples of the maintenance of the transport system SYS include maintenance work on the overhead transport vehicle 100, maintenance work on the grid-patterned rail R, and maintenance work on the storage unit 60U itself. The scaffold 65 is capable of supporting the operator U. The load capacity of the scaffold 65 is at least greater than the weight of a human body. The scaffold 65 is a member having a plurality of holes such as a grated or perforated metal member. The scaffold 65 is fixed to the single frames 63U and the bar-shaped members 64A. The scaffold has the plurality of holes mentioned above so that its weight can be reduced, and the vertical laminar flow (down flow) used for a clean room can be prevented from being blocked compared with a plate-shaped member.

The scaffold 65 is provided at an area other than the area AR1 of the plurality of placement sections 64. The scaffold 65 is disposed at a position that allows the operator U to access the overhead transport vehicle 100, the grid-patterned rail R, and the plurality of placement sections 64 within the single frames 63U. The storage unit 60U according to this preferred example is formed so that the operator U standing on the scaffold 65 can access the overhead transport vehicle 100, the grid-patterned rail R, and the plurality of placement sections 64 within the single frames 63U. The scaffold 65 includes a first scaffold 65A and a second scaffold 65B as shown in FIG. 5. The first scaffold 65A is horizontally longitudinal in the first direction D1 (X direction) and the second scaffold 65B is horizontally longitudinal in the second direction D2 (Y direction) perpendicular to the first direction D1. The first scaffold 65A and the second scaffold 65B are arranged to form an L shape as seen in a plan view. As described above, the single frames 63U (frame 63) includes the first scaffold 65A longitudinal in the first direction and the second fold 65B longitudinal in the second direction so that the scaffold 65 is formed in the two directions. As a result, compared to a scaffold 65 formed in one direction, the scaffold 65 can be effectively formed within the single frames 63U.

A width L1 (width of walkway) of the second scaffold 65B in the first direction D1 is smaller than a length L2 of each of the placement section 64 (area AR1) and a width L3 of the first scaffold 65A in the second direction D2 is smaller than a length L4 of each of the placement section 64 (area AR1) as shown in FIG. 5. The width L3 of the first scaffold 65A is shorter than the length L4 of the placement section 64 in the second direction D2 and the width L1 of the second scaffold 65B is shorter than the length L2 of the placement section in the first direction D1 so that the longitudinal space, which cannot be used for an installation of the placement section 64, can be effectively used for the scaffold 65 within the single frames. As described above, within the single frames 63U, the scaffold 65 is provided in the area other than the area AR1 in which the largest number of placement sections 64 are installed. With this configuration, the enough space for the scaffold 65 can be ensured while the placement section 64 is densely provided.

The first scaffold 65A and the second scaffold 65B are partially connected with or adjacent to each other, allowing the operator U to easily move between the first scaffold 65A and the second scaffold 65B. The edges of one or both of the first scaffold 65A and the second scaffold 65B extend to the vicinity of the outer edges of the single frames 63U. Both ends of the first scaffold 65A and the second scaffold 65B extend to the vicinity of the outer edges of the single frames 63U. The edge of one or both of the first scaffold 65A and the second scaffold 65B extends to the vicinity of the outer edges of the single frames 63U, allowing the operator U to easily access the scaffold 65 within the single frames 63U from the outside of the single frames 63U.

One or both of the first scaffold 65A and the second scaffold 65B are provided along the single frames 63U. Both of the first scaffold 65A and the second scaffold 65B are provided along the single frames 63U. One or both of the first scaffold 65A and the second scaffold 65B are provided along the single frames 63U so that the scaffold 65 is arranged at the portion having a high strength along the single frame 63U and, as a result, the strength of the scaffold 65 can be ensured.

As described above, the frame 63 is formed to surround the plurality of cells C in a plan view and the scaffold 65 is formed within the frame 63 to cross over the plurality of cells C in a plan view. With this configuration, a larger space can be ensured for the storage 60, onto which the article M is placed by the overhead transport vehicle 100, and the operator U can access the area within the frame 63.

As described above, according to the transport system SYS and the storage 60, the storage 60 includes the scaffold 65, which allows the operator U to easily access and perform maintenance work on the overhead transport vehicle 100, grid-patterned rail R and the article M, at the storage 60.

Second Preferred Example

A second preferred example will be now described. In this preferred example, the same reference signs are given to components or parts similar to those in the preferred example described above, and descriptions thereof are omitted or simplified where appropriate. Any configuration applicable to this preferred example in the matters described in the preferred examples herein is applied to this preferred example as appropriate.

Figure 10:
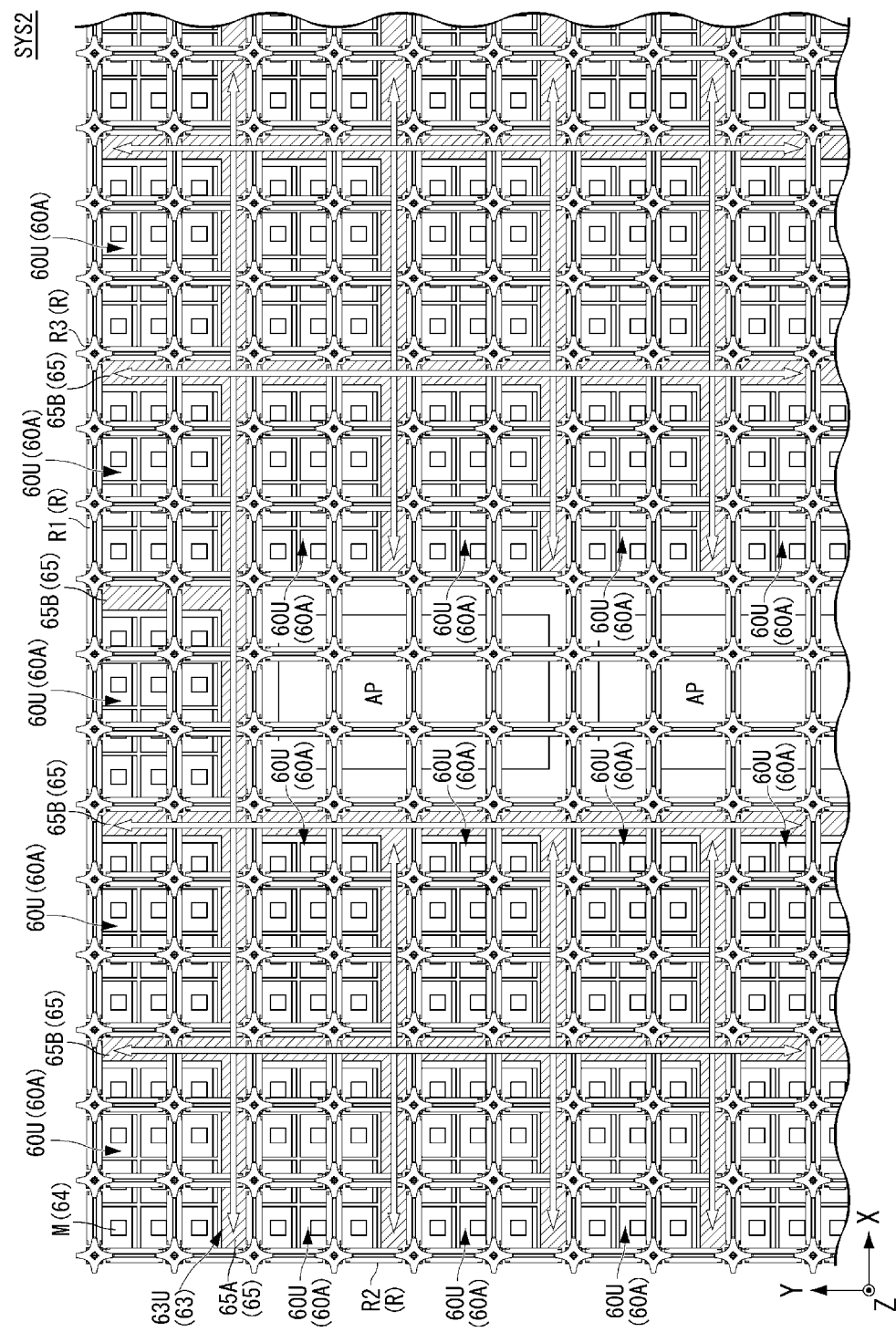
FIG. 10 is a top view of a transport system according to a second preferred example.
Figure 11:
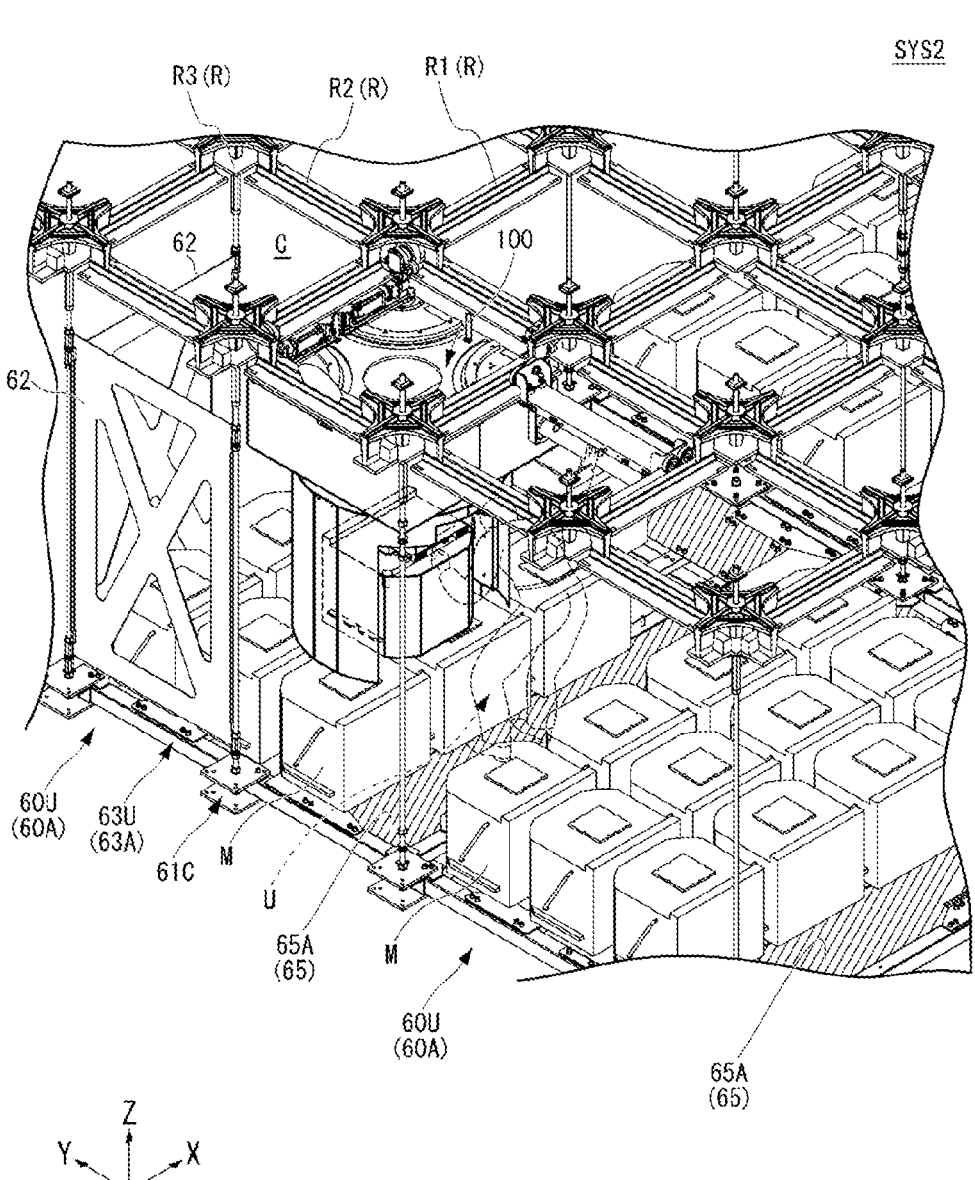
FIG. 11 is a perspective view of the transport system according to the second preferred example.

FIG. 10 is a top view seen from the +Z side showing a transport system SYS2 according to the second preferred example. FIG. 11 is a perspective view showing the transport system SYS2 according to the second preferred example. FIG. 11 shows an enlarged view of a part of the transport system SYS2. The transport system SYS2 includes a storage 60A instead of the storage 60 of the transport system SYS according to the first preferred example. The configurations in the transport system SYS2 according to the second preferred example are the same as those in the transport system SYS according to the first preferred example except for the storage 60 (storage unit 60U) of the first preferred example. FIG. 10 shows a processing apparatus AP such as an exposure apparatus, a coater-developer, a film forming apparatus, or an etching equipment. The processing apparatus AP performs a variety of processes on semiconductor wafers contained in a container transported by a vehicle V.

The storage 60A includes a plurality of the storage units 60U arranged in each of the X direction and the Y direction. The storage unit 60U has the same structure as that of the storage unit 60 according to the first preferred example. The storage 60A includes the storage units 60U having the same structure so that the configuration thereof can be simplified, and a reduction can be realized in manufacturing cost. The storage units 60U are arranged adjacent to each other. The frame 63 of the storage 60A is an aggregate of the single frames 63U arranged adjacent to each other. The frame 63 means an entire frame of the storage 60, 60A. In the storage units 60U adjacent to each other within the frame 63, the plurality of cells C including three (3) rows of cells C in the X direction and two (2) columns of cells C in the Y direction surrounded by each of the storage units 60U are formed adjacent to each other. The suspender 61 that suspends adjacent single frames 63U are shared by the plurality of storage units 60U. The storage 60A includes the storage units 60U arranged adjacent to each other so that the space for the scaffold 65 can be effectively ensured while the placement sections 64 are densely provided.

In the plurality of storage units 60U, the scaffolds 65 of the adjacent storage units 60U (single frames 63U) are arranged close to each other to allow the operator U to move between the scaffolds 65. With this configuration, the operator U can move easily between the scaffolds 65 of the adjacent storage units 60U (single frame 63U). In the storage 60A, the plurality of placement sections 64 are provided on both sides of the scaffolds 65 in the horizontal direction. With this configuration, the operator U can easily perform maintenance work on the placement section 64 from the scaffold 65. The scaffolds 65 are arranged thoroughly in the storage 60A in a plan view. The scaffolds 65 are provided ranging from the outer circumference to the center of the grid-patterned rail R in the storage 60A in a plan view. The scaffolds 65 with this configuration enable the operator U to easily access the center of the grid-patterned rail R. The scaffolds 65 are formed laterally and longitudinally to cross over the plurality of cells C in a plan view. The scaffolds 65 with this configuration enable the operator U to easily access each part of the grid-patterned rail R. In the storage 60A, a plurality of the first scaffolds 65A are arranged in the X direction (first direction D1) and a plurality of the second scaffolds 65B are arranged in the Y direction (second direction D2). In the storage 60A, the first scaffolds 65A adjacent to each other in the first direction D1 are arranged at the adjacent storage units 60U in a straight line and the second scaffolds 65B adjacent to each other in the second direction D2 are arranged at the adjacent storage units 60U in a straight line. The first scaffolds 65A extend from the edge of the frame 63 to the edge on the opposite side of the frame 63 in the first direction D1, and the second scaffolds 65B extend from the edge of the frame 63 to the edge on the opposite side of the frame 63 in the second direction D2. The first scaffolds 65A and the second scaffolds 65B are arranged in the X direction (first direction D1) and the Y direction (second direction D2) at a predetermined interval, respectively. The scaffolds 65 (first scaffolds 65A and second scaffolds 65B) in the storage 60A may be arranged in a grid pattern in a plan view. As described above, the scaffolds 65 are arranged in a grid pattern in a plan view so that the operator U can easily move onto the scaffolds 65 and easily access each part within the frame 63 (each part in the center area of the grid-patterned rail in a plan view).

In the transport system SYS2 according to this preferred example, each storage unit 60U is configured so that the operator U on the scaffold 56 can access the overhead transport vehicle 100 and the plurality of the placement sections 64 within the single frames 63U. With this configuration, also when maintenance work needs to be performed within the storage 60A, the operator U does not need to perform operations such as removal of the frame from the storage 60A. As shown in FIG. 11, the operator U can easily access the overhead transport vehicle 100 and the placement sections 64 placed within the storage 60A.

In the storage 60A, the scaffolds 65 extend to the vicinity of the outer edge of the storage 60A. Therefore, the operator U can easily enter the inside of the storage 60A from the outside of the storage 60A.

As described above, the frame 63 is an aggregate of the plurality of single frames 63U arranged adjacent to each other, and the scaffolds 65 of the adjacent single frames 63U are formed adjacent to each other. With this configuration, the frame 63 is formed as an aggregate of the plurality of single frames 63U so that the rigidity of the frame can be ensured. The plurality of single frames 63U are arranged adjacent to each other so that the single frames 63U can be densely provided. In addition, the scaffolds 65 of the single frames 63U are formed adjacent to each other so that the operator U can easily move between the scaffolds 65 of the adjacent single frames 63U.

As described above, the transport system SYS2 according to this preferred example includes the plurality of storage units 60U arranged adjacent to each other. With this configuration, the placement sections 64 can be densely provided without hindering the traveling operation of the overhead transport vehicle 100, and at the storage 60A for storing an article M suspended from the grid-patterned rail R, the operator U can easily access the overhead transport vehicle 100, the grid-patterned rail R, and an article M that are placed within the storage 60A.

As described above, the transport systems SYS, SYS2 according to the preferred examples are provided with the grid-patterned rail R including a plurality of first rails R1 extending in the first direction D1 and a plurality of second rails R2 extending in the second direction D2 different from the first direction D1 and forming a plurality of the cells C with the plurality of first rails R1 and the plurality of second rails R2, the overhead transport vehicle 100 that travels along the grid-patterned rail R, the suspenders 61 suspended from the grid-patterned rail R, the frame 63 surrounding at least one cell C in a plan view and provided below the suspenders 61, the placement sections 64 provided within the frame 63 and on which an article M is placed by the overhead transport vehicle 100, and the scaffold 65 provided within the frame 63 and serving as a walkway that allows the operator U to walk thereon. With the above configuration, the scaffold 65 is provided in the storages 60, 60A that store articles M and are suspended from the grid-patterned rail R so that the operator U can easily access and perform maintenance work on the overhead transport vehicle 100, the grid-patterned rail R, and the article M. In the transport systems SYS, SYS2, configurations other than those described above are optional and may or may not be provided.

The storages 60, 60A of the preferred examples of are used to store the article M in the above transport systems SYS, SYS2 and include the suspenders 61 suspended from the grid-patterned rail R, the frame 63 surrounding at least one cell C in a plan view and provided below the suspenders 61, the placement sections 64 provided within the frame 63 and on which an article M is placed by the overhead transport vehicle 100, and the scaffold 65 provided within the frame 63 and serving as a walkway that allows the operator U to walk thereon. According to the above configuration, the scaffold 65 is provided in the storages 60, 60A that store articles M and are suspended from the grid-patterned rail R so that the operator U can easily access and perform maintenance work on the overhead transport vehicle 100, the grid-patterned rail R, and article M. In the storages 60, 60A, configurations other than those described above are optional and may or may not be provided.

The technical scope of this disclosure is not limited to the descriptions in the above preferred examples. One or more requirements described in the above examples may be omitted. The requirements described in the above examples may be combined in an appropriate manner. To the extent permitted by law, disclosure of all of Japanese Patent Application No. 2019-169526 and in the above examples, is incorporated herein by reference to form a part of the description hereof.

Figure 12:
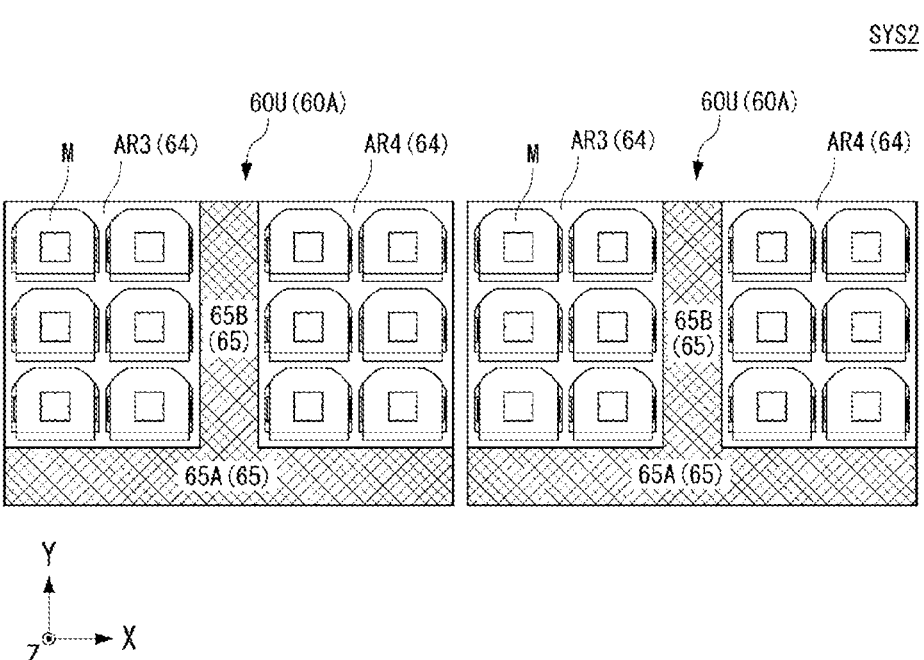
FIG. 12 is a top view of another example of the storage system.
Figure 13:
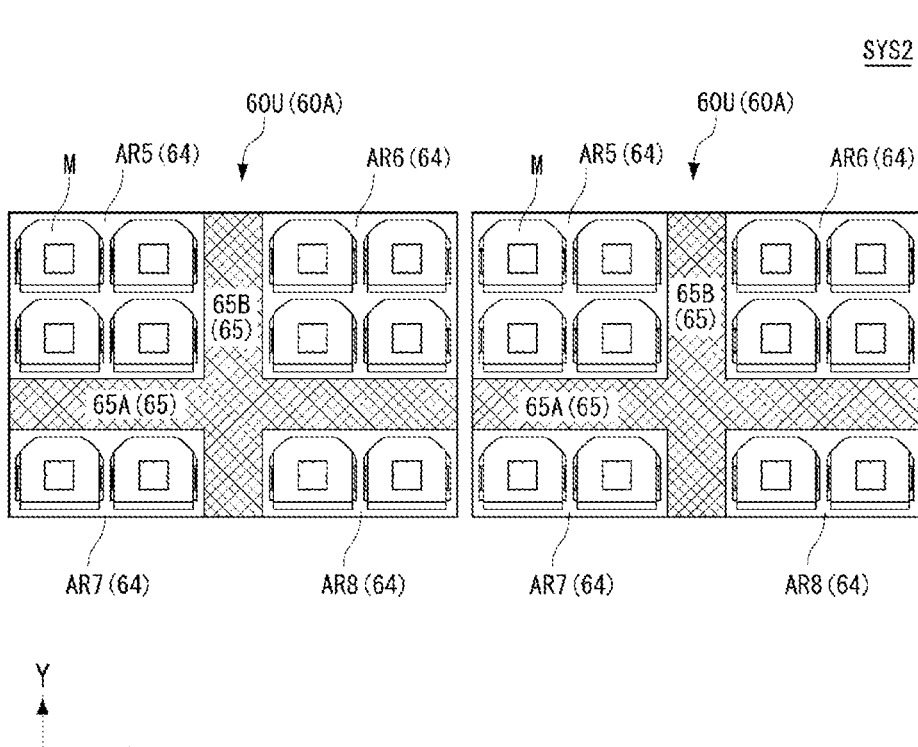
FIG. 13 is a top view of another example of the storage system.

For example, the configurations of the plurality of placement sections 64 and the scaffolds 65 (first scaffold 65A, second scaffold 65B) in each storage unit 60U are not limited to the above configurations. FIGS. 12 and 13 show other examples of the placement sections 64 and the scaffolds 65 with the frame 63 and so forth being omitted for simplification. For example, as shown in FIG. 12, the plurality of the placement sections 64 may be arranged in two areas, AR3 and AR4 in the storage unit 60U. The scaffold 65 (first scaffold 65A, second scaffold 65B) may be formed in a T-shape as seen in a plan view. Six (6) placement sections 64 arranged in 2 rows in the X direction and in 3 columns in the Y direction (2×3) are included in each of the area AR3 and the area AR4. The area AR 3 is provided on the –X side and the +Y side of the single frame 63U in a plan view and the area AR 4 is provided on the +X side and the +Y side of the single frame 63U in a plan view. The edges of first scaffold 65A and the second scaffold 65B extend to the vicinity of the outer edges of the single frames 63U. The first scaffold 65A is provided along the single frame 63U. The second scaffold 65B is provided in the center of the single frame 63U in the X direction. The first scaffold 65A and the second scaffold 65B are partially connected to or adjacent to each other. The first scaffolds 65A in the two storage units 60U are close to each other so that the operator U can move therebetween.

As shown in FIG. 13, the plurality of placement sections 64 may be arranged in four areas AR5, AR6, AR7, and AR8 in each of the storage units 60U. The scaffold 65 (first scaffold 65A, second scaffold 65B) may be formed in a cross shape as seen in a plan view. Four (4) placement sections 64 arranged in two (2) rows in X direction and two (2) columns in the Y direction (2×2) are included in the areas AR5 and AR6, respectively. Two (2) placement sections 64 arranged in two (2) rows in X direction and one (1) column in the Y direction (2×1) are included in the areas AR7 and AR8, respectively. The area AR5 is located on the –X side and the +Y side of the single frame 63U in a plan view. The area AR6 is located on the +X side and the +Y side of the single frame 63U in a plan view. The area AR7 is located on the –κside and the –Y side of the single frame 63U in a plan view. The area AR8 is located on the +X side and the –Y side of the single frame 63U in a plan view. Both edges of each of the first scaffold 65A and the second scaffold 65B extend to the vicinity of outer edges of the single frames 63U. The first scaffold 65A is provided along the single frame 63U and the second scaffold 65B is provided in the center of the single frame 63U in the X direction. The first scaffold 65A is provided at the inner portion of the single frames 63U in the Y direction. The first scaffold 65A and the second scaffold 65B are partially connected with or adjacent to each other. The first scaffolds 65A of the two storage units 60U are close to each other so that the operator U can move therebetween.

In the above description, in the storage 60A, each of the storage unit 60U includes the plurality of placement sections 64 and the scaffold 65 (first scaffold 65A and second scaffold 65B) each having the same configuration. However, the structure is not limited to such a configuration. For example, the placement sections 64 and the scaffold 65 (first scaffold 65A and second scaffold 65B) included in each storage unit 60U may have configurations different from each other.

Figure 14:
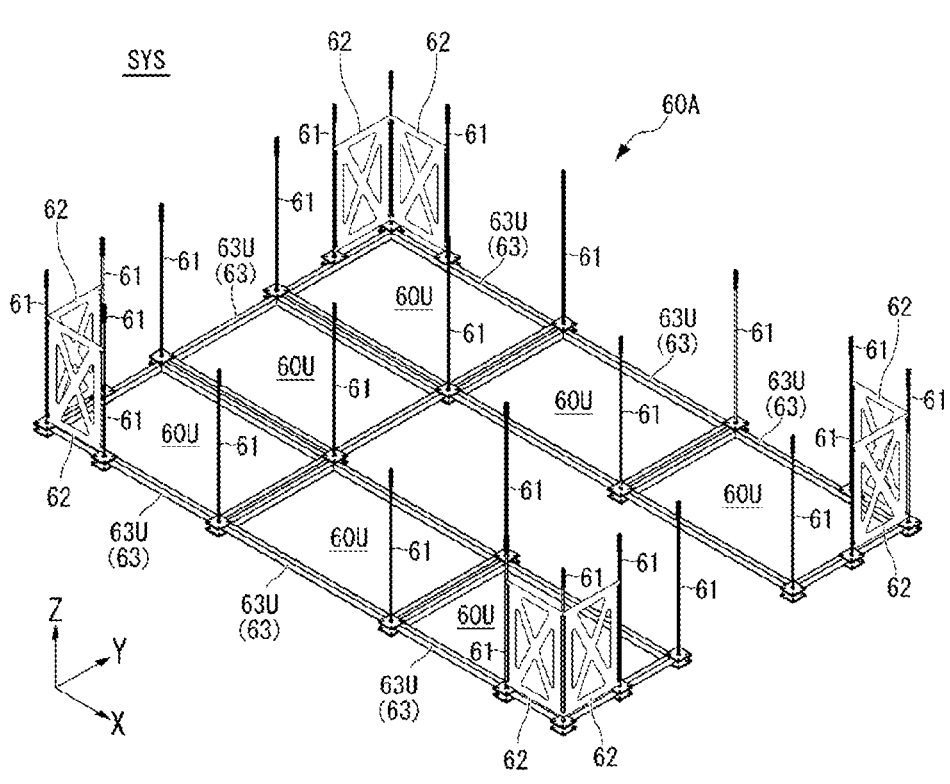
FIG. 14 is a perspective view of another example of the storage system.
Figure 15:
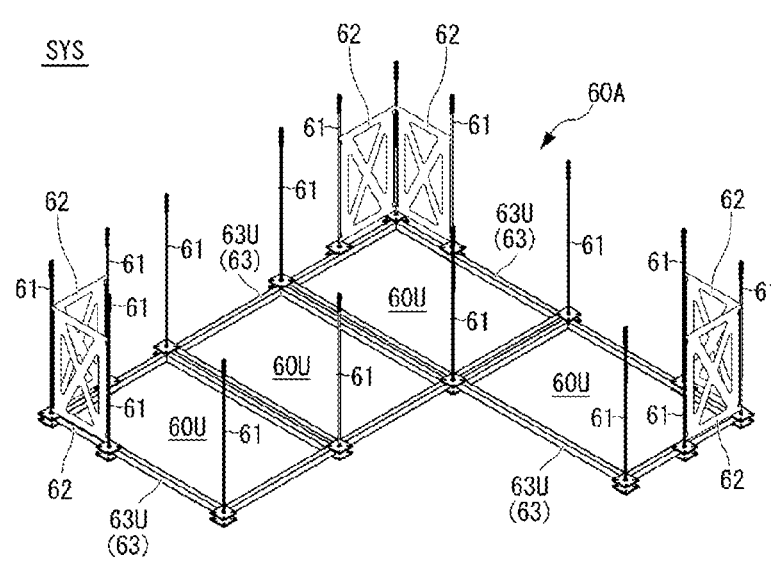
FIG. 15 is a perspective view of another example of the storage system.
Figure 15:
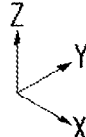
Figure 16:
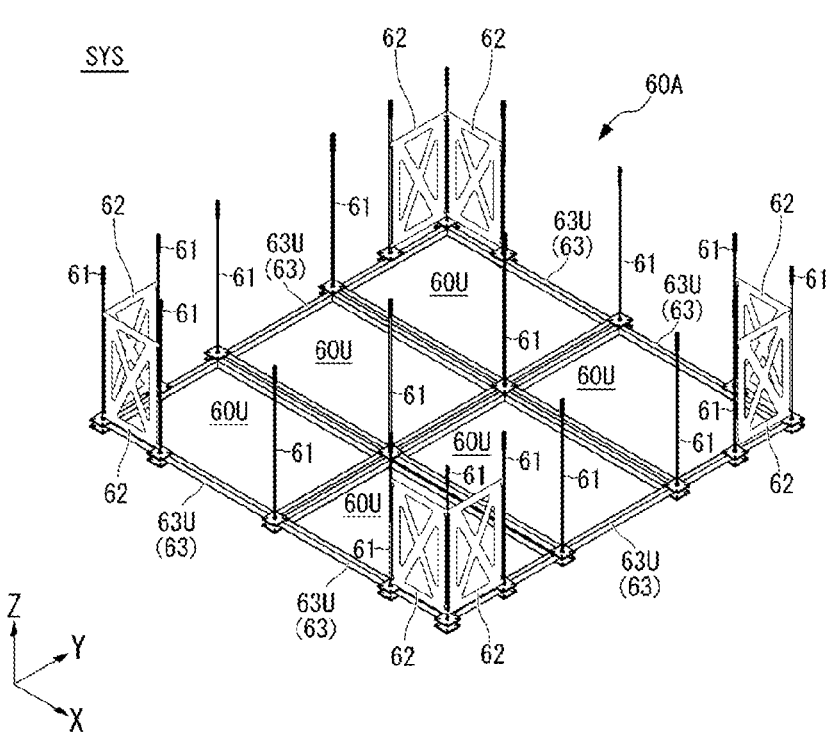
FIG. 16 is a perspective view of another example of the storage system.

In the above description, the storage 60A includes the plurality of storage units 60U as shown in the example of FIG. 10. However, the structure is not limited to such an example. FIGS. 14 to 16 are perspective views of other examples of the storage 60A. FIGS. 14 to 16 are views simplified by omitting the placement section 64 and the scaffold 65. For example, in the storage 60A, two (2) storage units 60U may be arranged adjacent to each other in the X direction as shown in FIGS. 12 and 13. The storage units 60U may be arranged adjacent to each other in a C-shape as seen in a plan view as shown in FIG. 14. The storage units 60U may be arranged adjacent to each other in a L-shape as seen in a plan view as shown in FIG. 15. Six (6) storage units 60U may be arranged in two (2) rows in the X direction and three (3) columns in the Y direction (2×3) as shown in FIG. 16.

In the example of the first preferred example, the storage unit 60U includes the coupling members 62. However, this disclosure is not limited to such an example, and the coupling members 62 need not be included. For example, when the plurality of storage units 60U are included in the storage 60A as shown in FIG. 10 to FIG. 16, the coupling members 62 may be included in some of the storage units 60U. For example, the coupling members 62 may be provided at the corners of the storage 60A. This enables effective suppression of the sway of the entire storage units 60U.

Further, a purge apparatus that replaces gas inside the article M such as FOUP may be provided at the storage 60, 60A (storage unit 60U).

In the above preferred examples, the grid-patterned rail R is formed with the first rails R1 (first direction D1) and the second rails R2 (second direction D2) that are perpendicular to each other. However, this disclosure is not limited to such an example. For example, the first rails R1 and the second rails R2 that are not perpendicular to each other may be used. Further, the rail R is not limited to the form exemplified by the grid-patterned rail R, in which the first rails R1 and the second rails R2 are intersecting with each other. For example, the rail R may be of a form in which the second rail R2 is arranged as being curved from the end of the first rail R1.

In the above examples, the overhead transport vehicle 100 travels while holding an article M below the grid-patterned rail R However, this disclosure is not limited to such an example. For example, the transport systems SYS, SYS2 and the storages 60, 60A (storage unit 60U) may include the overhead transport vehicle 100 that travels while holding an article M above the grid-patterned rail R.

The configurations of the storages 60, 60A in the above transport systems SYS, SYS2 described above are merely examples and do not limit configurations of storages 60, 60A. For example, the transport systems SYS, SYS2 may be any configuration that includes the suspenders suspended from the grid-patterned rail R, the frame 63 surrounding at least one cell in a plan view and provided below the suspenders, the placement sections 64 provided within the frame 63 and on which an article M is placed by the overhead transport vehicle 100, and the scaffold 65 provided within the frame 63 and serving as a walkway that allows the operator U to walk thereon, and may not be limited to the configurations of the preferred examples described above. For example, the storages 60, 60A need not be constituted by the storage unit 60U.

In the above preferred examples, the grid-patterned rail R has been taken as an example in which the overhead transport vehicle 100 travels on a pair of first rails R1 or a pair of second rails R2. However, the grid-patterned rail R is not limited to such a configuration. For example, the grid-patterned rail R (first rail R1, second rail R2) may be a monorail-type rail in which the overhead transport vehicle 100 travels on a single rail.

What is claimed is:

1. A transport system comprising:
a grid-patterned rail having a plurality of first rails extending in a first direction and a plurality of second rails extending in a second direction different from the first direction and intersecting with the first rails, and forming a plurality of cells with the plurality of first rails and the plurality of second rails;
an overhead transport vehicle that travels along the grid-patterned rail;
a suspender suspended from the grid-patterned rail; and
a frame that surrounds at least one of the cells in a plan view and is provided below the suspender,
wherein a placement section onto which an article is placed by the overhead transport vehicle and a scaffold functioning as a walkway that allows an operator to walk thereon are provided within the frame below the cells;
wherein the placement section and the scaffold are suspended above the ground;
the frame comprises a collection of approximately rectangular unit frames arranged adjacent to each other in the first direction or the second direction;
a plurality of placement portions is provided so as to be concentrated in an area that includes at least one of the four corners of each unit frame in a plan view;
each unit frame has an identical arrangement pattern of the placement portions and scaffold portions;
in the frame, the scaffold portions of the plurality of unit frames are continuous in both the first and second directions.

2. The transport system according to claim 1, wherein the frame is formed to surround the plurality of cells in a plan view, and
the scaffold is formed to cross over the plurality of cells in a plan view.

3. The transport system according to claim 2, wherein the scaffold is laterally and longitudinally formed to cross over the plurality of cells in a plan view.

4. The transport system according to claim 1, wherein the overhead transport vehicle travels with a main body suspended from the grid-patterned rail, and
the suspender is suspended from an intersection between the first rails and the second rails in the grid-patterned rails.

5. The transport system according to claim 1, wherein the placement sections are provided on both sides of the scaffold.

6. The transport system according to claim 1, wherein the frame is an aggregate of single frames disposed adjacent to each other, and
the scaffolds of respective adjacent single frames are formed adjacent to each other.

7. The transport system according to claim 6, wherein a plurality of the placement sections are provided within the single frames, and
the number of the plurality of placement sections is larger than the number of the cells surrounded by the single frames in a plan view.

8. The transport system according to claim 6, wherein the plurality of placement sections are collectively provided in the area including at least one of the four corners of the unit frame in a plan view, and
the scaffold is provided in an area other than the predetermined area within the single frames.

9. The transport system according to claim 6, wherein the single frames include, as the scaffold, a first scaffold horizontally longitudinal in the first direction and a second scaffold horizontally longitudinal in the second direction and perpendicular to the first direction.

10. The transport system according to claim 9, wherein a passage width of the first scaffold is shorter than a length of the placement section in the second direction, and
a passage width of the second scaffold is shorter than a length of the placement section in the first direction.

11. A storage system that stores an article in a transport system that includes a grid-patterned rail having a plurality of first rails extending in a first direction and a plurality of second rails extending in a second direction different from the first direction and intersecting with the first rails, and forming a plurality of cells with the plurality of first rails and the plurality of second rails, and an overhead transport vehicle that travels along the grid-patterned rail, the storage system comprising: a suspender suspended from the grid-patterned rail; and a frame that surrounds at least one of the cells in a plan view and is provided below the suspender, wherein a placement section onto which an article is placed by the overhead transport vehicle and a scaffold functioning as a walkway that allows an operator to walk thereon are provided within the frame below the cells; wherein the placement section and the scaffold are suspended above the ground; the frame comprises a collection of approximately rectangular unit frames arranged adjacent to each other in the first direction or the second direction; a plurality of placement portions is provided so as to be concentrated in an area that includes at least one of the four corners of each unit frame in a plan view; each unit frame has an identical arrangement pattern of the placement portions and scaffold portions; in the frame, the scaffold portions of the plurality of unit frames are continuous in both the first and second directions.

* * * * *